(12) United States Patent
Kim et al.

(10) Patent No.: US 10,788,905 B2
(45) Date of Patent: Sep. 29, 2020

(54) TOUCH-FINGERPRINT COMPLEX SENSOR, OPERATING METHOD THEREOF, AND ELECTRONIC APPARATUS INCLUDING THE TOUCH-FINGERPRINT COMPLEX SENSOR

(71) Applicant: SAMSUNG ELECTRONICS CO., LTD., Suwon-si (KR)

(72) Inventors: Jinmyoung Kim, Hwaseong-si (KR); Dongkyun Kim, Suwon-si (KR); Seokwhan Chung, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 10 days.

(21) Appl. No.: 16/169,430

(22) Filed: Oct. 24, 2018

(65) Prior Publication Data

US 2019/0171306 A1     Jun. 6, 2019

(30) Foreign Application Priority Data

Dec. 1, 2017 (KR) .................. 10-2017-0164340

(51) Int. Cl.
*G06F 3/0354* (2013.01)
*G06F 3/041* (2006.01)
(Continued)

(52) U.S. Cl.
CPC .......... *G06F 3/03547* (2013.01); *G06F 3/041* (2013.01); *G06F 3/047* (2013.01); *G06K 9/0002* (2013.01)

(58) Field of Classification Search
None
See application file for complete search history.

(56) References Cited

U.S. PATENT DOCUMENTS

2012/0268143 A1   10/2012  Badaye et al.
2014/0270414 A1*   9/2014  Slaby ................. G06K 9/00013
                                                  382/124
(Continued)

FOREIGN PATENT DOCUMENTS

EP     2879026 A1    6/2015
EP     3121695 A1    1/2017
EP     3163420 A1    5/2017

OTHER PUBLICATIONS

Communication dated Feb. 20, 2019, issued by the European Patent Office in counterpart European Patent Application No. 18209428.4.

*Primary Examiner* — Duane N Taylor, Jr.
(74) *Attorney, Agent, or Firm* — Sughrue Mion, PLLC

(57) ABSTRACT

Provided are touch-fingerprint complex sensors, operating methods thereof, and electronic apparatuses including the touch-fingerprint complex sensors. A touch-fingerprint complex sensor may include a plurality of first electrodes extending in a first direction in a touch pad, and a plurality of second electrodes extending in a second direction intersecting the first direction. The plurality of first electrodes may include a plurality of first touch electrodes disposed at regular intervals and a plurality of first sub-electrodes between adjacent ones of the plurality of first touch electrodes. The plurality of second electrodes may include a plurality of second touch electrodes disposed at regular intervals and a plurality of second sub-electrodes between adjacent ones of the plurality of second touch electrodes. The plurality of first touch electrodes may include a first unit group including electrodes, and at least one of the plurality of first sub-electrodes may be disposed between adjacent ones of the electrodes of the first unit group.

29 Claims, 26 Drawing Sheets

(51) Int. Cl.
*G06F 3/047* (2006.01)
*G06K 9/00* (2006.01)

(56) References Cited

U.S. PATENT DOCUMENTS

| | | |
|---|---|---|
| 2014/0333328 A1 | 11/2014 | Nelson et al. |
| 2015/0091849 A1 | 4/2015 | Ludden |
| 2016/0224818 A1 | 8/2016 | Song et al. |
| 2016/0283023 A1 | 9/2016 | Shin et al. |
| 2016/0350570 A1 | 12/2016 | Han et al. |
| 2017/0024602 A1 | 1/2017 | Han et al. |
| 2017/0123555 A1 | 5/2017 | Kim |
| 2017/0293378 A1 | 10/2017 | Ahn et al. |
| 2017/0336909 A1 | 11/2017 | Song et al. |
| 2017/0336910 A1 | 11/2017 | Han et al. |
| 2019/0018517 A1* | 1/2019 | Chang .................. G01R 31/50 |

* cited by examiner

FIRST COMPARATIVE EXAMPLE    SECOND COMPARATIVE EXAMPLE    EMBODIMENT

FIRST COMPARATIVE EXAMPLE

SECOND COMPARATIVE EXAMPLE

EMBODIMENT

FIRST
COMPARATIVE EXAMPLE

Slow

SECOND
COMPARATIVE EXAMPLE

Slow

EMBODIMENT

Slow

FIRST
COMPARATIVE EXAMPLE

Fast

SECOND
COMPARATIVE EXAMPLE

Fast

EMBODIMENT

Fast

< COMPARATIVE EXAMPLE >

TOUCH-FINGERPRINT COMPLEX SENSOR, OPERATING METHOD THEREOF, AND ELECTRONIC APPARATUS INCLUDING THE TOUCH-FINGERPRINT COMPLEX SENSOR

CROSS-REFERENCE TO RELATED APPLICATION

This application claims priority from Korean Patent Application No. 10-2017-0164340, filed on Dec. 1, 2017, in the Korean Intellectual Property Office, the disclosure of which is incorporated herein in its entirety by reference.

BACKGROUND

1. Field

Apparatuses and methods consistent with example embodiments relate to touch-fingerprint complex sensors, operating methods thereof, and electronic apparatuses including the touch-fingerprint complex sensors.

2. Description of the Related Art

A touch screen is an input device including a screen which, when a user touches or presses is with a finger or the like, recognizes information about a position of the touch or about the user and transmits the information to a system. A touch screen is simple and easy to use. In particular, a capacitive touch screen has high transmittance, excellent durability, superior touch resolution, and multi-touch capability. A touch screen panel may be used in mobile devices, such as smart phones and tablet PCs, and also in any of a wide variety of electronic devices such as automatic teller machines (ATMs), automatic ticket issuing machines, and navigation devices.

In recent years, there has been an increasing need for personal authentication during use of various mobile devices and electronic devices. Personal authentication based on personal features such as a fingerprint, a voice, a face, and an iris can be used in mobile devices, access control devices, financial devices, and other devices. Fingerprint recognition technologies for smart phones and tablet PCs according to methods of the related art operate on a fingerprint recognition module that is separate from the touch screen module.

SUMMARY

One or more example embodiments may provide touch-fingerprint complex sensors capable of sensing both a touch and a fingerprint and having improved sensing performance. One or more example embodiments may also provide touch-fingerprint complex sensors having improved linearity for touch sensing.

One or more example embodiments may provide operating methods of the touch-fingerprint complex sensors.

One or more example embodiments may provide electronic apparatuses including the touch-fingerprint complex sensors.

Additional example aspects and advantages will be set forth in part in the description which follows and, in part, will be apparent from the description, or may be learned by practice of the presented example embodiments.

According to an aspect of an example embodiment, a touch-fingerprint complex sensor includes: a touch pad including a fingerprint recognizing region; a plurality of first electrodes extending in a first direction in the touch pad; and a plurality of second electrodes extending in a second direction intersecting the first direction in the touch pad, wherein the plurality of first electrodes include a plurality of first touch electrodes substantially disposed at regular intervals and a plurality of first sub-electrodes disposed between adjacent ones of the plurality of first touch electrodes, the plurality of second electrodes include a plurality of second touch electrodes substantially disposed at regular intervals and a plurality of second sub-electrodes disposed between adjacent ones of the plurality of second touch electrodes, the plurality of first touch electrodes include a first unit group including first touch electrodes electrically connected to each other, wherein at least one of the plurality of first sub-electrodes is disposed between adjacent ones of the first touch electrodes of the first unit group, and the plurality of second touch electrodes include a second unit group including second touch electrodes electrically connected to each other, wherein at least one of the plurality of second sub-electrodes is disposed between adjacent ones of the second touch electrodes of the second unit group.

A first group of the first sub-electrodes may be disposed at one side of one of the first touch electrodes of the first unit group, and a second group of the first sub-electrodes may be disposed at another side of the one of the first touch electrodes of the first unit group, wherein the first group of the first sub-electrodes and the second group of the first sub-electrodes may be electrically connected to each other.

A third group of the first sub-electrodes may be disposed at one side of another of the first touch electrodes of the first unit group, and a fourth group of the first sub-electrodes may be disposed at another side of the other of the first touch electrodes of the first unit group, wherein the third group of the first sub-electrodes and the fourth group of the first sub-electrodes may be electrically connected to each other.

The touch-fingerprint complex sensor may further include: a first connecting wire connecting end portions of the first touch electrodes of the first unit group; and a second connecting wire connecting an end portion of the first group of the first sub-electrodes and an end portion of the second group of the first sub-electrodes to each other, wherein the first connecting wire and the second connecting wire may intersect each other as viewed from above.

Either one of the first and second connecting wires may include a via structure and a conductive plug provided in the via structure.

A first group of the second sub-electrodes may be disposed at one side of one of the second touch electrodes of the second unit group, and a second group of the second sub-electrodes may be disposed at another side of the one of the second touch electrodes of the second unit group, wherein the first group of the second sub-electrodes and the second group of the second sub-electrodes may be electrically connected to each other.

A third group of the second sub-electrodes may be disposed at one side of another of the second touch electrodes of the second unit group, and a fourth group of the second sub-electrodes may be disposed at another side of the other of the second touch electrodes of the second unit group, wherein the third group of the second sub-electrodes and the fourth group of the second sub-electrodes may be electrically connected to each other.

The touch-fingerprint complex sensor may further include: a third connecting wire connecting end portions of the second touch electrodes of the second unit group; and a fourth connecting wire connecting an end portion of the first group of the second sub-electrodes and an end portion of the second group of the second sub-electrodes to each other, wherein the third connecting wire and the fourth connecting wire may intersect each other when viewed from above.

Either one of the third and fourth connecting wires may include a via structure and a conductive plug provided in the via structure.

A plurality of the first unit groups of the plurality of first touch electrodes may be provided on one side or two sides of the fingerprint recognizing region in the second direction, and a plurality of the second unit groups of the plurality of second touch electrodes may be provided on one side or two sides of the fingerprint recognizing region in the first direction.

The first unit group may include three or more first touch electrodes, and the second unit group may include three or more second touch electrodes.

The touch pad may include an active region including the fingerprint recognizing region, and a peripheral region around the active region, wherein the peripheral region may include wires connecting the plurality of first electrodes and the plurality of second electrodes to a circuit unit, wherein some of the plurality of first electrodes may be electrically connected and some of the plurality of second electrodes may be electrically connected in the peripheral region.

A shape of the touch pad may be circular or oval.

The touch pad may include an active region and a bezel region around the active region, wherein some of the plurality of first electrodes may be electrically connected and some of the plurality of second electrodes may be electrically connected in the bezel region.

A shape of the touch pad may be rectangular.

The touch-fingerprint complex sensor may be configured to, in a touch detecting mode, selectively activate the plurality of first touch electrodes and the plurality of second touch electrodes, and apply a fixed bias voltage to the plurality of first sub-electrodes and the plurality of second sub-electrodes.

The plurality of first touch electrodes may be transmit electrodes, the plurality of second touch electrodes may be receive electrodes, and the touch-fingerprint complex sensor may be further configured to, in the touch detecting mode, apply a ground voltage to the plurality of first sub-electrodes and apply a first bias voltage that is different from the ground voltage to the plurality of second sub-electrodes.

The touch-fingerprint complex sensor may further include: a circuit unit connected to the plurality of first electrodes and the plurality of second electrodes, wherein the circuit unit may include an analog front-end (AFE) amplifier, wherein the first bias voltage may be same voltage as an input bias voltage of the AFE amplifier.

End portions of first electrodes corresponding to the fingerprint recognizing region from among the plurality of first electrodes may be independently provided without being electrically connected to each other, and end portions of second electrodes corresponding to the fingerprint recognizing region from among the plurality of second electrodes may be independently provided without being electrically connected to each other.

The touch-fingerprint complex sensor may be configured to, in a fingerprint recognizing mode, selectively activate first electrodes corresponding to the fingerprint recognizing region from among the plurality of first electrodes and second electrodes corresponding to the fingerprint recognizing region from among the plurality of second electrodes, and apply a fixed bias voltage to remaining first and second electrodes.

According to an aspect of another example embodiment, an electronic apparatus includes the touch-fingerprint complex sensor.

According to an aspect of another example embodiment, a touch-fingerprint complex sensor capable of detecting a touch and a fingerprint of a user, the touch-fingerprint complex sensor includes: a plurality of first touch electrodes extending in a first direction; a plurality of first sub-electrodes provided between adjacent ones of the plurality of first touch electrodes; a plurality of second touch electrodes extending in a second direction intersecting the first direction; and a plurality of second sub-electrodes provided between adjacent ones of the plurality of second touch electrodes, wherein the plurality of first touch electrodes include a first unit group including first touch electrodes electrically connected to each other, wherein at least one of the plurality of first sub-electrodes is disposed between two adjacent first touch electrodes of the first unit group, the plurality of second touch electrodes include a second unit group including second touch electrodes electrically connected to each other, wherein at least one of the plurality of second sub-electrodes is disposed between two adjacent second touch electrodes of the second unit group, and the touch-fingerprint complex sensor is configured to, in a touch detecting mode, selectively drive the plurality of first touch electrodes and the plurality of second touch electrodes and apply a fixed bias voltage to the plurality of first sub-electrodes and the plurality of second sub-electrodes.

The plurality of first touch electrodes may be transmit electrodes, the plurality of second touch electrodes may be receive electrodes, and the touch-fingerprint complex sensor may be further configured to, in the touch detecting mode, apply a ground voltage to the plurality of first sub-electrodes and apply a first bias voltage that is different from the ground voltage to the plurality of second sub-electrodes.

The touch-fingerprint complex sensor may further include a circuit unit, wherein the circuit unit may include an analog front-end (AFE) amplifier, wherein the first bias voltage may be same as a voltage of an input bias of the AFE amplifier.

The touch-fingerprint complex sensor may include: an active region including a fingerprint recognizing region; and a peripheral region provided around the active region.

The peripheral region may include at least one of: a first connection structure in which some of the plurality of first touch electrodes are electrically connected; a second connection structure in which some of the plurality of first sub-electrodes are electrically connected; a third connection structure in which some of the plurality of second touch electrodes are electrically connected; and a fourth connection structure in which some of the plurality of second sub-electrodes are electrically connected.

At least one of the first through fourth connection structures may include a via structure and a conductive plug provided in the via structure.

A finger recognizing region may be defined in the touch-fingerprint complex sensor, wherein end portions of electrodes corresponding to the fingerprint recognizing region from among the plurality of first touch electrodes and the plurality of first sub-electrodes may be independently provided without being electrically connected to each other, and end portions of electrodes corresponding to the fingerprint recognizing region from among the plurality of second touch electrodes and the plurality of second sub-electrodes may be independently provided without being electrically connected to each other.

A fingerprint recognizing region may be defined in the touch-fingerprint complex sensor, wherein the touch-fingerprint complex sensor may be configured to, in a fingerprint recognizing mode, selectively activate electrodes corresponding to the fingerprint recognizing region from among the plurality of first touch electrodes and the plurality of first sub-electrodes and electrodes corresponding to the fingerprint recognizing region from among the plurality of second touch electrodes and the plurality of second sub-electrodes, and apply a fixed bias voltage to remaining electrodes.

A shape of the touch-fingerprint complex sensor may be circular, oval, or rectangular.

According to an aspect of another example embodiment, an electronic apparatus includes the touch-fingerprint complex sensor.

BRIEF DESCRIPTION OF THE DRAWINGS

These and/or other example aspects and advantages will become apparent and more readily appreciated from the following description of the example embodiments, taken in conjunction with the accompanying drawings in which.

DETAILED DESCRIPTION

Figure 1:
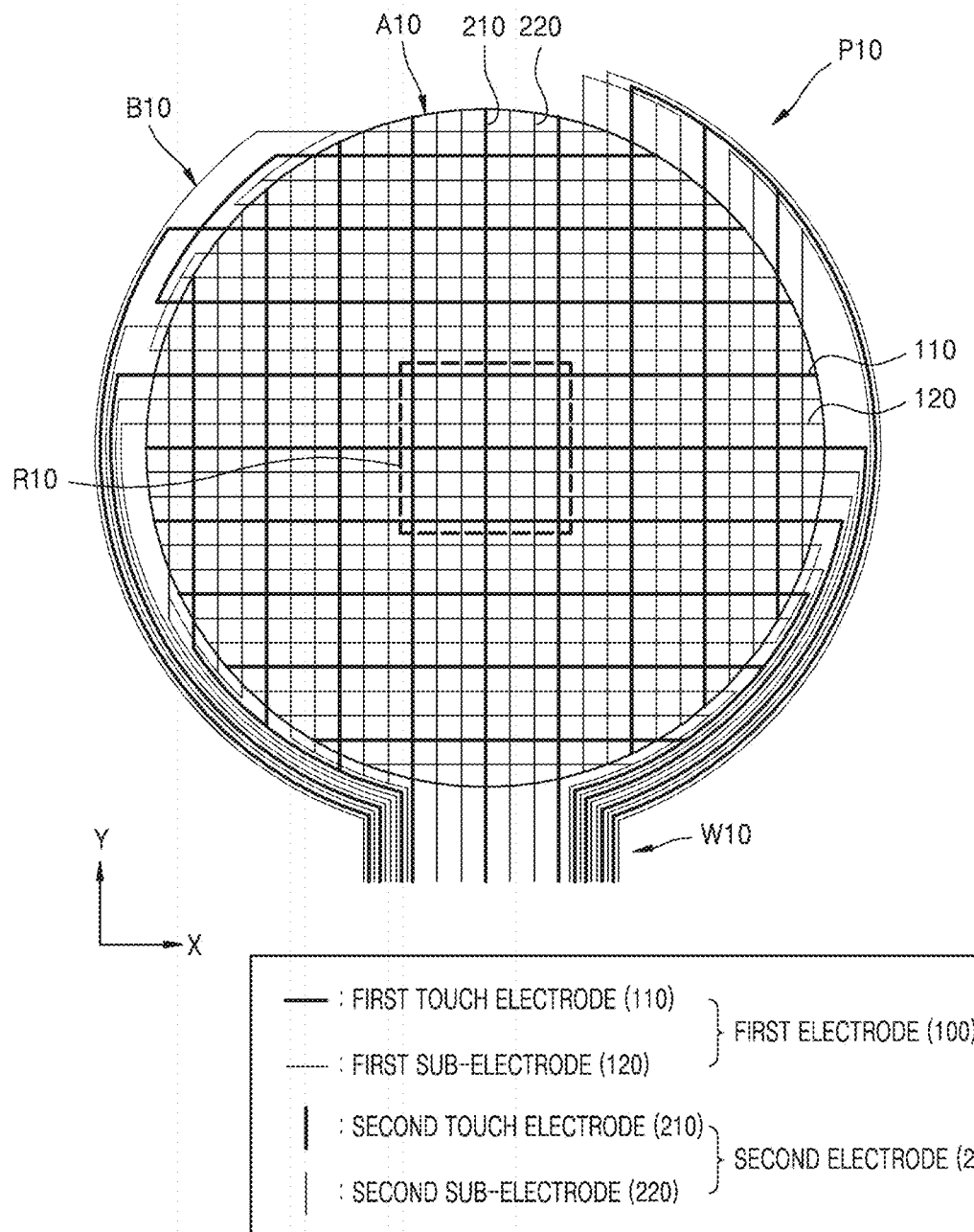
FIG. 1 is a plan view of a touch-fingerprint complex sensor according to an example embodiment.

Various example embodiments will now be described more fully with reference to the accompanying drawings in which example embodiments are shown.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of the example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, touch-fingerprint complex sensors, methods of operating the touch-fingerprint complex sensors, and electronic apparatuses including the touch-fingerprint complex sensors, according to embodiments, will be described with reference to accompanying drawings. Widths or thickness of layers or regions in drawings may be exaggerated for clarity and convenience of description. Throughout the specification, like reference numerals denote like elements.

FIG. 1 is a plan view of a touch-fingerprint complex sensor according to an example embodiment.

Referring to FIG. 1, a touch pad P10 including a fingerprint recognizing region R10 may be provided. A plurality of first electrodes 100 extending in a first direction, for example, X-axis direction, and a plurality of second electrodes 200 extending in a second direction, for example, Y-axis direction, and intersecting the plurality of first electrodes 100, may be provided in the touch pad P10. The plurality of first electrodes 100 and the plurality of second electrodes 200 may intersect at right angles. An insulating layer may be disposed between the plurality of first electrodes 100 and the plurality of second electrodes 200. In other words, the plurality of first electrodes 100 and the plurality of second electrodes 200 may be spaced apart from each other by the insulating layer. The plurality of second electrodes 200 may be provided on the plurality of first electrodes 100 or vice versa. The plurality of first electrodes 100 may be disposed at substantially regular (same) intervals, and the plurality of second electrodes 200 may also be disposed at substantially regular (same) intervals.

The first electrodes 100 may include a plurality of first touch electrodes 110 disposed at substantially regular (same) intervals and a plurality of first sub-electrodes 120 disposed between the plurality of first touch electrodes 110 and/or at two sides of the plurality of first touch electrodes 110. Similarly, the plurality of second electrodes 200 may include a plurality of second touch electrodes 210 disposed at substantially regular (same) intervals and a plurality of second sub-electrodes 220 disposed between the plurality of second touch electrodes 210 and/or at two sides of the plurality of second touch electrodes 210. The plurality of first touch electrodes 110 may each be a transmit (TX) electrode and the plurality of second touch electrodes 210 may each be a receive (RX) electrode, or vice versa.

The plurality of first touch electrodes 110 may include electrodes of a first unit group which are electrically connected to each other, and at least one first sub-electrode 120 may be disposed between the electrodes of the first unit group. In other words, some of the plurality of first touch electrodes 110 may be electrically connected in groups, and at least one first sub-electrode 120 may be disposed between the first touch electrodes 110 in a group, as will be described in detail with reference to FIG. 2.

The plurality of second touch electrodes 210 may include electrodes of a second unit group which are electrically connected to each other, and at least one second sub-electrode 220 may be disposed between the electrodes of the second unit group. In other words, some of the plurality of second touch electrodes 210 may be electrically connected in groups, and at least one second sub-electrode 220 may be disposed between the second touch electrodes 210 in a group, as will be described in detail with reference to FIG. 3.

Figure 2:
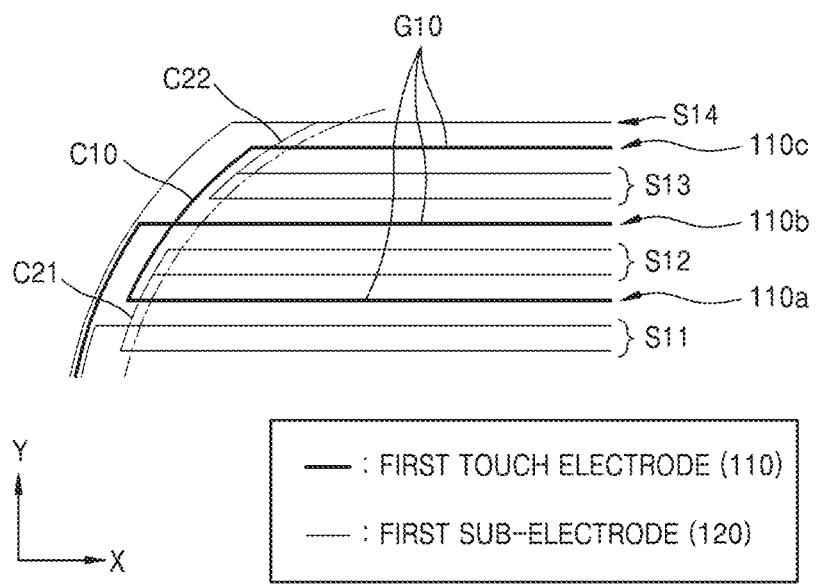
FIG. 2 is a plan view showing portions of a plurality of first electrodes of FIG. 1.

FIG. 2 is a plan view of portions of the plurality of first electrodes 100 of FIG. 1.

Referring to FIG. 2, the plurality of first electrodes may include the plurality of first touch electrodes 110 and the plurality of first sub-electrodes 120. The plurality of first touch electrodes 110 may include first touch electrodes 110a through 110c of a first unit group G10, which are electrically connected to each other. In other words, end portions of the first touch electrodes 110a through 110c of the first unit group G10 may be electrically connected to each other. Here, the three first touch electrodes 110a through 110c form the first unit group G10. At least one first sub-electrode 120 may be disposed between two of the first touch electrodes 110a through 110c of the first unit group G10.

First sub-electrodes S11 of a first group may be disposed at one side of the first touch electrode 110a, from among the first touch electrodes 110a through 110c of the first unit group G10, and first sub-electrodes S12 of a second group may be disposed at another side of the first touch electrode 110a, wherein the first touch electrodes S11 of the first group and the first sub-electrodes S12 of the second group may be electrically connected to each other. First sub-electrodes S13 of a third group may be disposed at one side of the first touch electrode 110c, from among the first touch electrodes 110a through 110c of the first unit group G10, and first sub-electrode(s) S14 of a fourth group may be disposed at another side of the first touch electrode 110c, wherein the first sub-electrodes S13 of the third group and the first sub-electrode(s) S14 of the fourth group may be electrically connected to each other. The first touch electrode 110b may be disposed between the first touch electrodes 110a and 110c. In this case, the first sub-electrodes S12 of the second group may be disposed at one side of the first touch electrode 110b and the first sub-electrodes S13 of the third group may be disposed at another side of the first touch electrode 110b. In FIG. 2, the number of first sub-electrodes S11 of the first group is 2, but is only an example and may vary. For example, the first group may include one first sub-electrode S11 or about 15 first sub-electrodes S11. Alternately, the first group may include about 2 to 12 or 4 to 10 first sub-electrodes S11. The same applies to the first sub-electrodes S12 of the second group, the first sub-electrodes S13 of the third group, and the first sub-electrodes S14 of the fourth group. However, the number of the first sub-electrodes in each group is not limited to the above.

A first connecting wire C10 (first connection structure) connecting end portions of the first touch electrodes 110a through 110c of the first unit group G10 may be provided. A second connecting wire C21 (second connection structure) connecting end portions of the first sub-electrodes S11 of the first group and end portions of the first sub-electrodes S12 of the second group may be provided. Another second connecting wire C22 (second connection structure) connecting end portions of the first sub-electrode S13 of the third group and end portion(s) of the first sub-electrode(s) S14 of the fourth group may be provided. The first connecting wire C10 and the second connecting wire C21 may intersect each other when viewed from the above. Also, the first connecting wire C10 and the second connecting wire C22 may intersect each other when viewed from above. The second connecting wire C21 and the second connecting wire C22 may be commonly referred to as second connecting wires. Any one of the first connecting wire C10 and the second connecting wires C21 and C22 may include a via structure and a conductive plug provided in the via structure, as will be described below with reference to FIG. 4.

Figure 3:
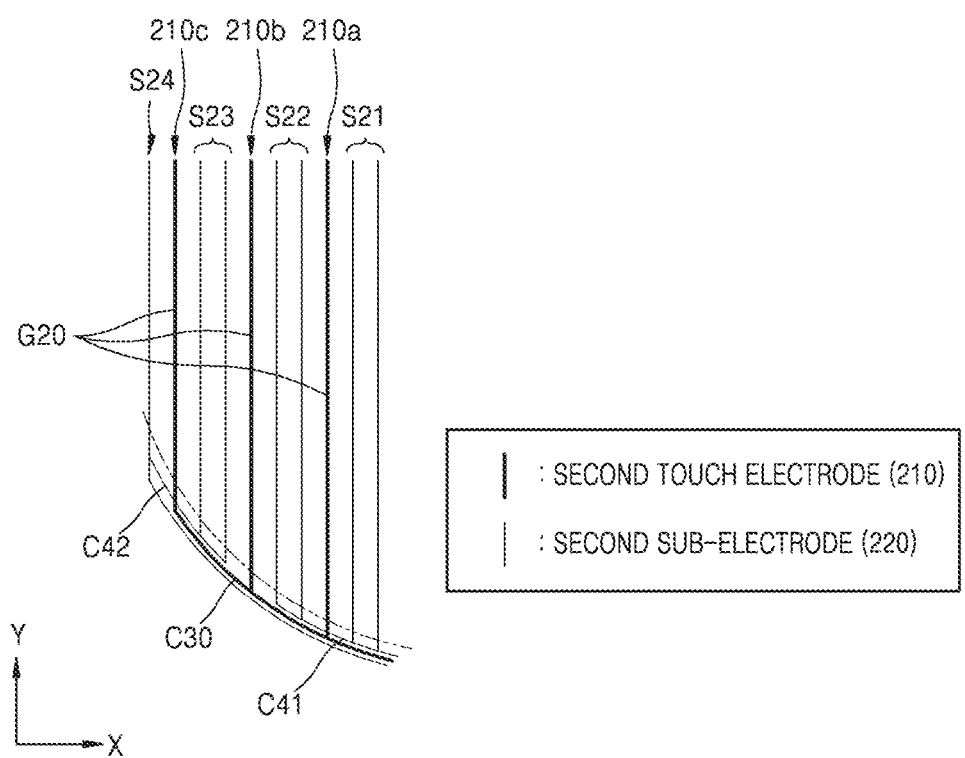
FIG. 3 is a plan view showing portions of a plurality of second electrodes of FIG. 1.

FIG. 3 is a plan view of portions of the plurality of second electrodes 200 of FIG. 1.

Referring to FIG. 3, the plurality of second electrodes may include the plurality of second touch electrodes 210 and the plurality of second sub-electrodes 220. The plurality of second touch electrodes 210 may include second touch electrodes 210a through 210c of a second unit group G20, which are electrically connected to each other. In other words, end portions of the second touch electrodes 210a through 210c of the second unit group G20 may be electrically connected to each other. Here, the three second touch electrodes 210a through 210c form the second unit group G20. At least one second sub-electrode 220 may be disposed between two of the second touch electrodes 210a through 210c of the second unit group G20.

Second sub-electrodes S21 of a first group may be disposed at one side of the second touch electrode 210a, from among the second touch electrodes 210a through 210c of the second unit group G20, and second sub-electrodes S22 of a second group may be disposed at another side of the second touch electrode 210a, wherein the second touch electrodes S21 of the first group and the second sub-electrodes S22 of the second group may be electrically connected to each other. Second sub-electrodes S23 of a third group may be disposed at one side of the second touch electrode 210c, from among the second touch electrodes 210a through 210c of the second unit group G20, and second sub-electrode(s) S24 of a fourth group may be disposed at another side of the second touch electrode 210c, wherein the second sub-electrodes S23 of the third group and the second sub-electrode(s) S24 of the fourth group may be electrically connected to each other. The second touch electrode 210b may be disposed between the second touch electrodes 210a and 210c. In this case, the second sub-electrodes S22 of the second group may be disposed at one side of the second touch electrode 210b and the second sub-electrodes S23 of the third group may be disposed at another side of the second touch electrode 210b. In FIG. 3, the number of second sub-electrodes S21 of the first group is 2, but this is only an example and may vary. For example, the first group may include one second sub-electrode S21 or about 15 second sub-electrodes S21. Alternately, the first group may include about 2 to 12 or 4 to 10 second sub-electrodes S21. The same applies to the second sub-electrodes S22 of the second group, the second sub-electrodes S23 of the third group, and the second sub-electrodes S24 of the fourth group. However, the number of the first sub-electrodes in each group is not limited to the above.

A third connecting wire C30 (third connection structure) connecting end portions of the second touch electrodes 210a through 210c of the second unit group G20 may be provided. A fourth connecting wire C41 (fourth connection structure) connecting end portions of the second sub-electrodes S21 of the first group and end portions of the second sub-electrodes S22 of the second group may be provided. Another fourth connecting wire C42 (fourth connection structure) connecting end portions of the second sub-electrode S23 of the third group and end portion(s) of the second sub-electrode(s) S24 of the fourth group may be provided. The third connecting wire C30 and the fourth connecting wire C41 may intersect each other when viewed from the above. Also, the third connecting wire C30 and the fourth connecting wire C42 may intersect each other when viewed from the above. The fourth connecting wire C41 and the fourth connecting wire C42 may be commonly referred to as fourth connecting wires. Any one of the third connecting wire C30 and the fourth connecting wires C41 and C42 may include a via structure and a conductive plug provided in the via structure.

Figure 4:
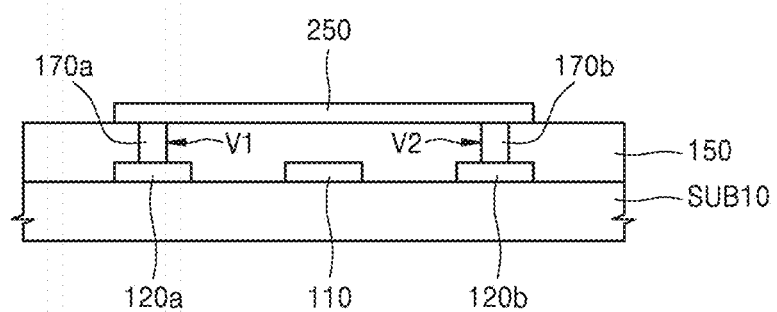
FIG. 4 is a cross-sectional view for describing a connection through a via used in a touch-fingerprint complex sensor, according to an example embodiment.

FIG. 4 is a cross-sectional view for describing a connection through a via, which is applicable to a touch-fingerprint complex sensor, according to an example embodiment.

Referring to FIG. 4, the first touch electrode 110 may be provided on a substrate SUB10, and first sub-electrodes 120a and 120b may be provided on two sides of the first touch electrode 110 on the substrate SUB10. Here, the first touch electrode 110 may be one of the first touch electrodes 110a through 110c of the first unit group G10 of FIG. 2. The first sub-electrode 120a may be referred to as a first sub-electrode 120a and the first sub-electrode 120b may be referred to as a first sub-electrode 120b. An insulating layer 150 covering the first touch electrode 110 and the first sub-electrodes 120a and 120b may be provided on the substrate SUB10, and first and second via holes V1 and V2 exposing the first sub electrodes 120a and 120b may be formed in the insulating layer 150. The first via hole V1 may correspond to the first sub-electrode 120a, and the second via hole V2 may correspond to the first sub-electrode 120b. The first via hole V1 may be filled with a first conductive plug 170a, and the second via hole V2 may be filled with a second conductive plug 170b. A connecting wire 250 connected to (contacting) the first and second conductive plugs 170*a* and 170*b* may be provided on the insulating layer 150. Accordingly, the first sub-electrodes 120*a* and 120*b* may be electrically connected to each other by the connecting wire 250 and the first and second conductive plugs 170*a* and 170*b*. The connecting wire 250 and the first and second conductive plugs 170*a* and 170*b* may form one "connection structure". Such a connection through a via may be applied to the second connecting wires, i.e., the second connecting wires C21 and C22, or the first connecting wire C10 of FIG. 2. Also, the connection through a via may be applied to the fourth connecting wires, i.e., the fourth connecting wires C41 and C42, or the third connecting wire C30 of FIG. 3.

Referring back to FIG. 1, the touch pad P10 may include an active region A10 and a peripheral region B10 provided around the active region A10. The fingerprint recognizing region R10 may be included in the active region A10.

The peripheral region B10 may include wires connecting the pluralities of first and second electrodes 100 and 200 to a circuit unit (not shown). Accordingly, the peripheral region B10 may be referred to as a trace region or a tracer region. Some of the plurality of first electrodes 100 may be electrically grouped in the peripheral region B10, and some of the plurality of second electrodes 200 may be electrically grouped in the peripheral region B10. The peripheral region B10 may include at least one of the first connection structure (for example, the first connecting wire C10 of FIG. 1) electrically grouping some of the plurality of first touch electrodes 110, the second connection structure (the second connecting wires C21 and C22 of FIG. 2) electrically grouping some of the plurality of first sub-electrodes 120, the third connection structure (for example, the third connecting wire C30 of FIG. 3) electrically grouping some of the plurality of second touch electrodes 210, and the fourth connection structure (for example, the fourth connecting wires C41 and C42 of FIG. 3) electrically grouping some of the plurality of second sub-electrodes 220, wherein at least one of the first through fourth connection structures may include a via structure and a conductive plug included in the via structure as shown in FIG. 4. In FIG. 1, a reference numeral W10 may denote a wiring portion or a connecting portion for connecting tracers of the peripheral region B10 to the circuit unit.

When some of the plurality of first electrodes 100 are electrically grouped and some of the plurality of second electrodes 200 are electrically grouped in the peripheral region B10, a configuration of wires in the peripheral region B10 may be simplified and the density of the wires may be decreased. As a result, the size of the peripheral region B10 may be small.

End portions of the first electrodes 100 corresponding to the fingerprint recognizing region R10 from among the plurality of first electrodes 100 may be independently provided without being connected to each other. Also, end portions of the second electrodes 200 corresponding to the fingerprint recognizing region R10 from among the plurality of second electrodes 200 may be independently provided without being connected to each other. The first electrodes 100 (the first touch electrodes 110 and the first sub-electrodes 120) and the second electrodes 200 (the second touch electrodes 210 and the second sub-electrodes 220) corresponding to the fingerprint recognizing region R10 may be all independently driven. When the touch-fingerprint complex sensor is in a fingerprint recognizing mode, the first and second electrodes 100 and 200 corresponding to the fingerprint recognizing region R10 may be selectively activated, and a fixed bias voltage may be applied to the remaining first and second electrodes 100 and 200. In the fingerprint recognizing region R10, electrode patterns (i.e., the first and second electrodes 100 and 200) may be disposed at intervals of dozens of μm from one another. In an example embodiment, the first and second electrodes 100 and 200 may be disposed at intervals of about 30 to 90 μm or about 50 to 70 μm from one another. During fingerprint recognition, a minute electrode pattern smaller than a touch detection pattern may be used.

The electric grouping of the first touch electrodes 110 and the electric grouping of the second touch electrodes 210 may be performed outside the fingerprint recognizing region R10. A plurality of first unit groups (for example, the first unit groups G10 of FIG. 2), in which the plurality of first touch electrodes 110 are grouped, may be arranged at one side or two sides of the fingerprint recognizing region R10 in the second direction (Y-axis direction). A plurality of second unit groups (for example, the second unit groups G20 of FIG. 3), in which the plurality of second touch electrodes 210 are grouped, may be arranged at one side or two sides of the fingerprint recognizing region R10 in the first direction (X-axis direction). In FIGS. 1 through 3, each of the first unit groups G10 includes three first touch electrodes 110, and each of the second unit groups G20 includes three second touch electrodes 210, but the number of electrodes included in each unit group may vary. For example, each of the first and second unit groups G10 and G20 may include two electrodes or more than three electrodes. Also, in FIG. 1, one first unit group G10 of FIG. 2 exists on each side of the fingerprint recognizing region R10 in the Y-axis direction, there may be more than one first unit group G10. Similarly, in FIG. 1, one second unit group G20 of FIG. 3 exists on each side of the fingerprint recognizing region R10 in the Y-axis direction, but there may be more than one second unit group G20. Accordingly, during touch detection, the plurality of first unit groups G10 may be simultaneously touched in a region in which a finger of the user is touching the touch-fingerprint complex sensor, and similarly, the plurality of second unit groups G20 may be simultaneously touched.

In the touch detecting mode using the touch-fingerprint complex sensor, the plurality of touch electrodes 110 and the plurality of second touch electrodes 210 may be selectively activated over the entire region of the touch pad P10, and the fixed bias voltage may be applied to the plurality of first sub-electrodes 120 and the plurality of second sub-electrodes 220. In the touch detecting mode, the plurality of first sub-electrodes 120 and the plurality of second sub-electrodes 220 may be used as dummy electrodes. The plurality of first touch electrodes 110 may be arranged, for example, at intervals of about 0.5 to 5 mm, and the plurality of second touch electrodes 210 may be arranged, for example, at intervals of about 0.5 to 5 mm.

When the plurality of first touch electrodes 110 are $T_X$ electrodes and the plurality of second touch electrodes 210 are $R_X$ electrodes, a ground voltage may be applied to the plurality of first sub-electrodes 120 and a first bias voltage, different from the ground voltage, may be applied to the plurality of second sub-electrodes 220 in the touch detecting mode. Here, the first bias voltage may be a voltage that is the same or substantially the same as an input bias voltage of an analog front-end (AFE) amplifier of the circuit unit. As such, when the fixed bias voltage is applied to the plurality of first sub-electrodes 120 and the plurality of second sub-electrodes 220 in the touch detecting mode, noise may be reduced and a touch detecting performance may be improved. Since the plurality of first sub-electrodes 120 and the plurality of second sub-electrodes 220 form a uniform electrode pattern throughout the surface of the touch pad P10 together with the plurality of first touch electrodes 110 and the plurality of second touch electrodes 210, a change of visibility may be reduced and formation of moiré fringes may be suppressed. Also, the plurality of first sub-electrodes 120 and the plurality of second sub-electrodes 220 may be used as fixed bias electrodes during touch detection and some of the plurality of first sub-electrodes 120 and the plurality of second sub-electrodes 220 may be used as fingerprint recognizing electrodes during fingerprint recognition.

During fingerprint recognition, the touch-fingerprint complex sensor may be vulnerable to external noise due to low mutual capacitance Cm, the first touch electrode 110 and the first sub-electrode 120 corresponding to the fingerprint recognizing region R10 do not intersect each other, and the second touch electrode 210 and the second sub-electrode 220 corresponding to the fingerprint recognizing region R10 do not intersect each other. In the current example embodiment, the first touch electrode 110 and the first sub-electrode 120 corresponding to the fingerprint recognizing region R10 do not intersect each other even in the peripheral region B10, and the second touch electrode 210 and the second sub-electrode 220 corresponding to the fingerprint recognizing region R10 do not intersect each other. Accordingly, no problems occur due to intersection of the electrodes during fingerprint recognition. The first touch electrode 110 and the first sub-electrode 120 intersect each other through a via in the peripheral region B10 corresponding to a touch region outside the fingerprint recognizing region R10. Since the electrodes intersect each other in the peripheral region B10 and an effect caused by the intersection of the electrodes is relatively low during touch detection, a signal generated during finger recognition may be barely affected.

In the current example embodiment, the touch pad P10 may have a circular or oval structure. In this case, the peripheral region B10 may be a bezel region. In the case of a circular touch pad (sensor), when the circular touch pad (sensor) and an electrode pattern (channel) are densely arranged, the number of wires connecting and extending outside an active region (display region) increases, and as a result, the size of the bezel region may be increased. Since the size of the bezel region is large in comparison with the display region and a driving integrated circuit (IC) for driving the bezel region requires additional channels, such a circular touch pad may be disadvantageous in terms of prices and mountability. However, in the current example embodiment, since the electrodes are grouped and connected through a via in the peripheral region B10 (i.e., the bezel region), the above issues may not occur. Accordingly, according to an example embodiment, the size of the peripheral region B10 (the bezel region) may be reduced, the design complexity with regard to a driving IC may be reduced, and cost and mountability of the touch pad (sensor) may not raise any issues. In FIG. 1, the touch pad P10 is circular, but a structure of the touch pad P10 is not limited thereto. The touch pad P10 may be a rectangular structure, a polygonal structure, or any other structure.

Figure 5:
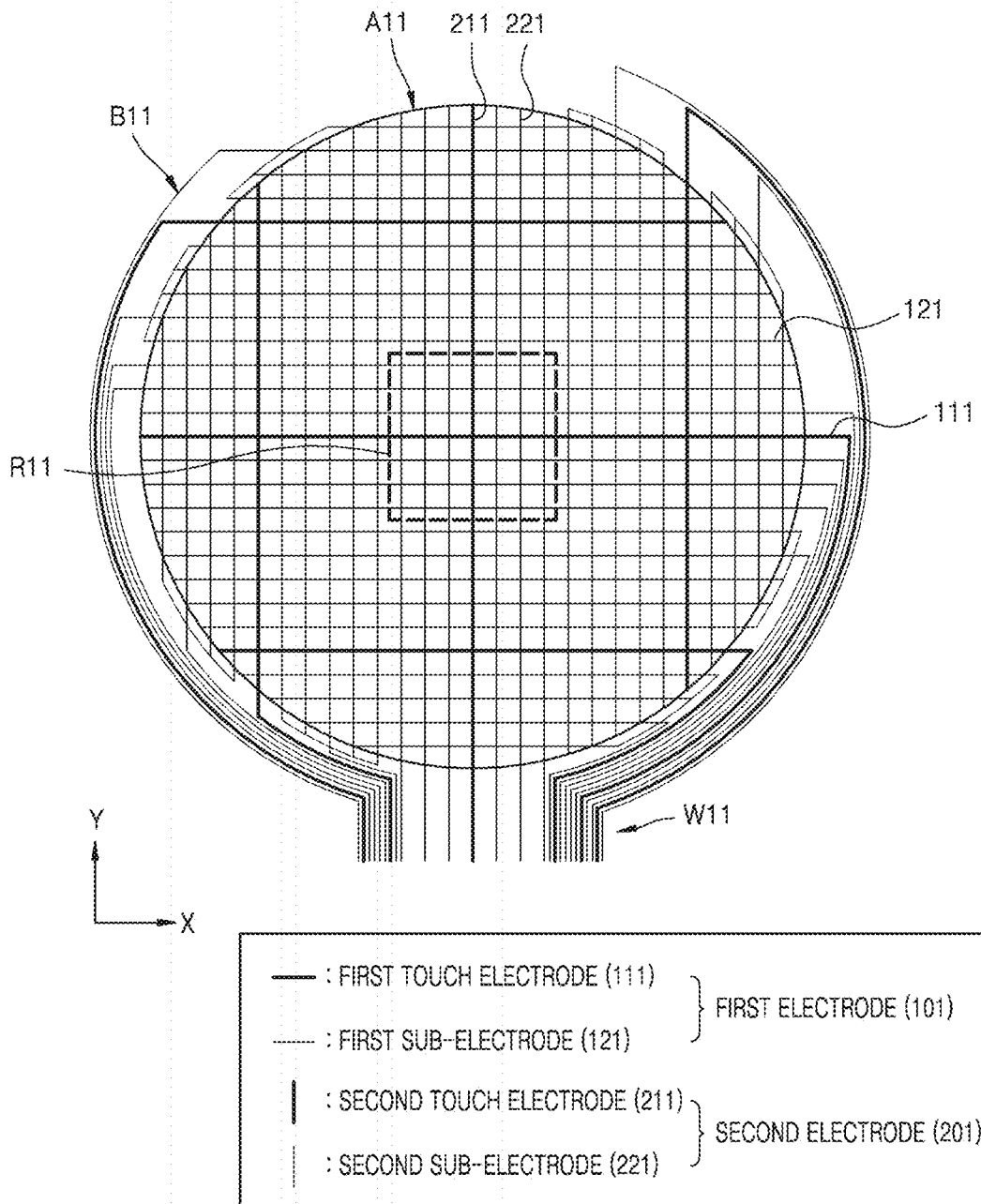
FIG. 5 is a plan view of a touch-fingerprint complex sensor according to a first comparative example.

FIG. 5 is a plan view of a touch-fingerprint complex sensor according to a first comparative example.

Referring to FIG. 5, a plurality of first electrodes 101 extending in an X-axis direction and a plurality of second electrodes 201 extending in a Y-axis direction and intersecting the plurality of first electrodes 101 may be arranged. The plurality of first electrodes 101 may include a plurality of first touch electrodes 111 spaced apart at regular intervals and a plurality of first sub-electrodes 121 provided between and at two sides of the plurality of first touch electrodes 111. Similarly, the plurality of second electrodes 201 may include a plurality of second touch electrodes 211 spaced apart at regular intervals and a plurality of second sub-electrodes 221 provided between and at two sides of the plurality of second touch electrodes 211.

The plurality of first touch electrodes 111 may not be electrically grouped, but may be independently arranged. In other words, end portions of the plurality of first touch electrodes 111 may not be electrically/physically connected to each other. Similarly, the plurality of second touch electrodes 211 may not be electrically grouped, but may be independently arranged. In other words, end portions of the plurality of second touch electrodes 211 may not be electrically/physically connected to each other.

In FIG. 5, reference numerals A11, B11, R11, and W11 respectively denote an active region, a peripheral region, a fingerprint recognizing region, and a wiring portion.

Figure 6:
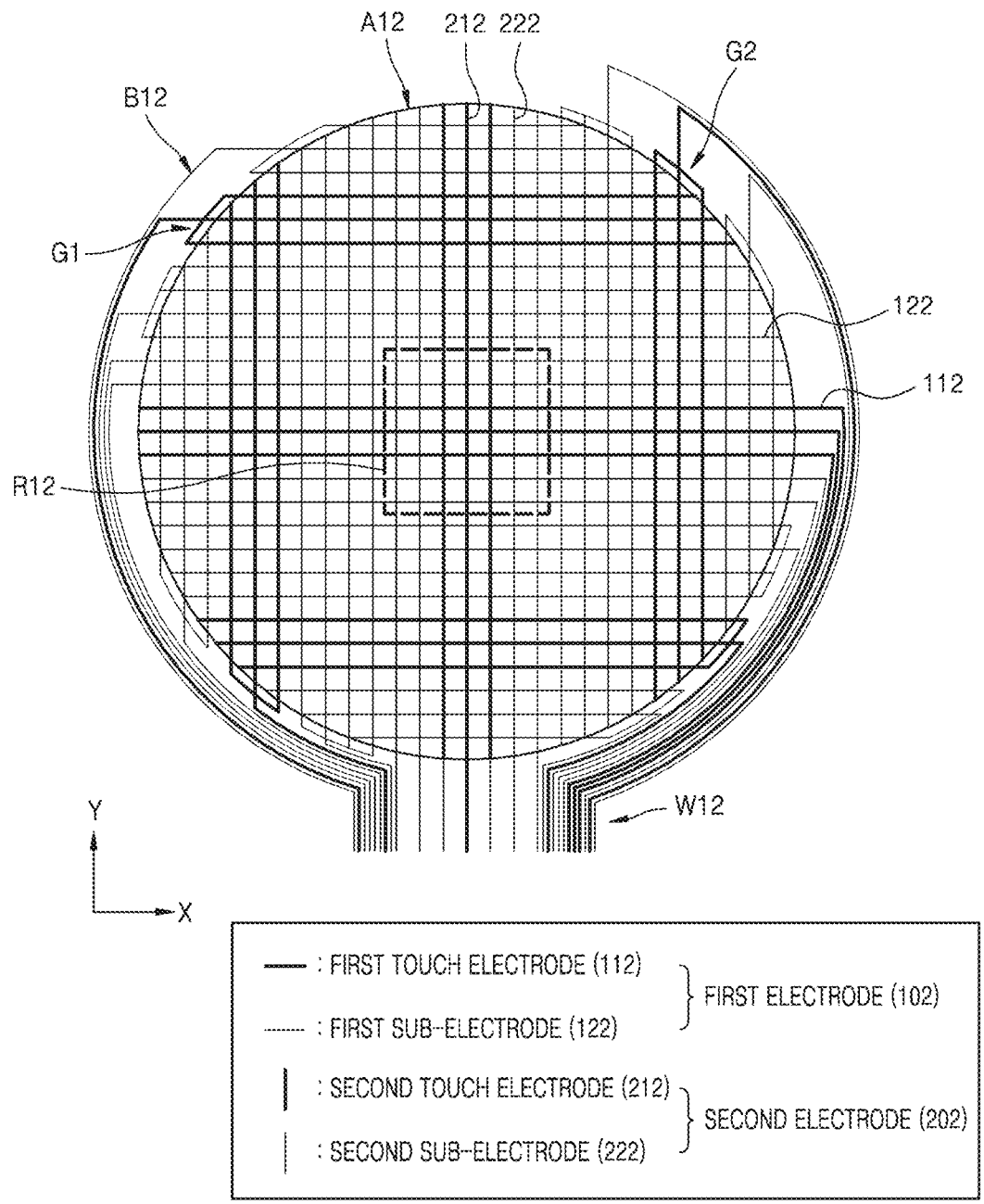
FIG. 6 is a plan view of a touch-fingerprint complex sensor according to a second comparative example.

FIG. 6 is a plan view of a touch-fingerprint complex sensor according to a second comparative example.

Referring to FIG. 6, a plurality of first electrodes 102 extending in an X-axis direction and a plurality of second electrodes 202 extending in a Y-axis direction and intersecting the plurality of first electrodes 101 may be arranged. The plurality of first electrodes 102 may include a plurality of first touch electrodes 112 and a plurality of first sub-electrodes 122. Similarly, the plurality of second electrodes 202 may include a plurality of second touch electrodes 212 and a plurality of second sub-electrodes 222.

The plurality of first touch electrodes 112 may have a structure in which unit groups G1, each including a plurality of the first touch electrodes 112 that are electrically grouped, are regularly arranged. The first touch electrodes 112 in each unit group G1 may be arranged to be adjacent to each other, such that none of the first sub-electrodes 122 are disposed between adjacent ones of the first touch electrodes 112 in each unit group G1. The plurality of first sub-electrodes 122 may be disposed between the unit groups G1. Accordingly, the plurality of first touch electrodes 112 are not necessarily arranged at regular intervals overall.

The plurality of second touch electrodes 212 may have a structure in which unit groups G2, each including a plurality of the second touch electrodes 212 that are electrically grouped, are regularly arranged. The second touch electrodes 212 in each unit group G2 may be arranged to be adjacent to each other, such that none of the second sub-electrodes 222 are disposed between adjacent ones of the second touch electrodes 212 in each unit group G2. The plurality of second sub-electrodes 222 may be disposed between the unit groups G2. Accordingly, the plurality of second touch electrodes 212 are not necessarily arranged at regular intervals overall.

In FIG. 6, reference numerals A12, B12, R12, and W12 respectively denote an active region, a peripheral region, a fingerprint recognizing region, and a wiring portion.

In terms of the arrangement of touch lines, the configuration of the touch-fingerprint complex sensor according to the first comparative example of FIG. 5 may be referred to as "single uniform arrangement" and the configuration of the touch-fingerprint complex sensor according to the second comparative example of FIG. 6 may be referred to as "bundle non-uniform arrangement". Also, the configuration of the touch-fingerprint complex sensor according to the example embodiment of FIG. 1 may be referred to as "bundle/distributed uniform arrangement". However, these terms are used for convenience of description and do not limit or restrict the scope of the present disclosure.

A mutual capacitance Cm between the first touch electrode 111 and the second touch electrode 211, intersecting the first touch electrode 111, in the first comparative example of FIG. 5 may be about 0.5 pF, and mutual capacitance Cm between the three first touch electrodes 112, forming one group, and the three second touch electrodes 212, forming one group and intersecting the three first touch electrodes 112, in the second comparative example of FIG. 6 may be about 1.5 pF. The mutual capacitance Cm between the three first touch electrodes 110, forming one group, and the three second touch electrodes 210, forming one group and intersecting the three first touch electrodes 110, in the example embodiment of FIG. 1 may be about 1.5 pF. In other words, even when touch lines are arranged in the "bundle/distributed uniform arrangement" as in the example embodiment, the mutual capacitance Cm may be maintained to be the same as (or similar to) that in the second comparative example and thus a touch linearity may be improved according to the uniform distributed arrangement. According to the example embodiment, a limited number of touch lines may be uniformly distributed, and performance, such as the touch linearity, may be improved.

When TX and RX lines are realized by using single lines, as in the first comparative example of FIG. 5, sensitivity and linearity may be decreased due to low mutual capacitance Cm and a wide interval, and it may be difficult to detect a continuous touch operation. When pluralities of TX and RX lines are grouped, as in the second comparative example of FIG. 6, sensitivity may be increased but there is a limit to securing excellent linearity. However, when touch lines are arranged in the "bundle/distributed uniform disposition" as in the example embodiment, sensitivity and linearity may both be increased, as will be described later with reference to FIGS. 15 through 18.

Figure 7:
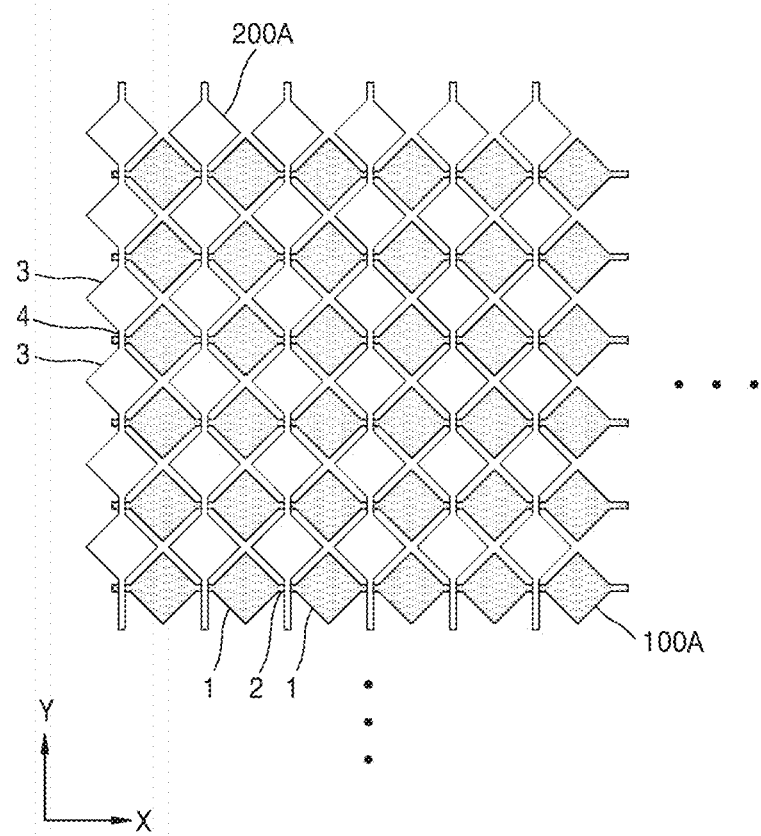
FIG. 7 is a plan view for describing configurations of a plurality of first electrodes and a plurality of second electrodes used in a touch-fingerprint complex sensor, according to an example embodiment.

FIG. 7 is a plan view for describing configurations of a plurality of first electrodes 100A and a plurality of second electrodes 200A, which are applicable to a touch-fingerprint complex sensor, according to an example embodiment.

Referring to FIG. 7, the touch-fingerprint complex sensor may include the plurality of first electrodes 100A extending in a first direction, for example, an X-axis direction, and the plurality of second electrodes 200A extending in a second direction, for example, a Y-axis direction. The first electrode 100A may include a plurality of rhombus shape pattern portions 1 and connecting portions 2, respectively disposed between adjacent ones of the plurality of rhombus shape pattern portions 1. Similarly, the second electrode 200A may include a plurality of rhombus shape pattern portions 3 and connecting portions 4, respectively disposed between adjacent ones of the plurality of rhombus shape pattern portions 3. The connecting portions 4 of the second electrodes 200A may be disposed to correspond to the connecting portions 2 of the first electrodes 100A. An insulating layer may be provided between the plurality of first electrodes 100A and the plurality of second electrodes 200A. Capacitance, i.e., mutual capacitance, may be formed between the plurality of first electrodes 100A and the plurality of second electrodes 200A. The first and second electrodes 100A and 200A may each be formed of transparent conductive oxide (TC), such as indium tin oxide (ITO), indium zinc oxide (IZO), aluminum zinc oxide (AZO), gallium zinc oxide (GZO), aluminum gallium zinc oxide (AGZO), or gallium indium zinc oxide (GIZO). Here, the pluralities of first and second electrodes 100A and 200A include the rhombus shape pattern portions 3 and 4 and the connecting portions 2 and 4 therebetween, but the configurations of the first and second electrodes 100A and 200A may vary therefrom. The pluralities of the first and second electrodes 100A and 200A may have pattern portions in other polygonal shapes instead of rhombus shapes, and at least one of the pluralities of the first and second electrodes 100A and 200A may have a line pattern.

Figure 8:
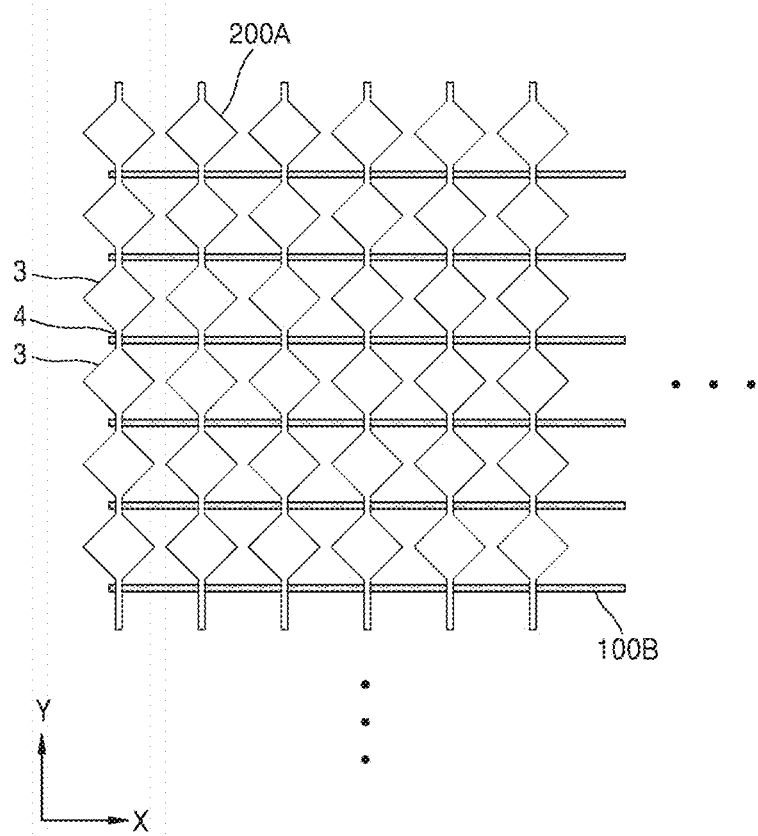
FIG. 8 is a plan view for describing configurations of a plurality of first electrodes and a plurality of second electrodes used in a touch-fingerprint complex sensor, according to another example embodiment.

FIG. 8 is a plan view for describing configurations of a plurality of first electrodes 100B and the plurality of second electrodes 200A, which are applicable to a touch-fingerprint complex sensor, according to another example embodiment.

Referring to FIG. 8, the touch-fingerprint complex sensor may include the plurality of first electrodes 100B extending in an X-axis direction, and the plurality of second electrodes 200A extending in a Y-axis direction intersecting the X-axis direction. The first electrodes 100B may in the form of lines, and the second electrodes 200A may each include a plurality of rhombus shape pattern portions 3 and connecting portions 4, respectively disposed between adjacent ones of the plurality of rhombus shape pattern portions 3.

The plurality of first electrodes 100B may be formed of a metal, an alloy, or a metal compound. Since the first electrode 100B may have a width of several μm, the first electrode 100B may appear transparent to the naked eye even when the first electrode 100B is formed of a metal. In some cases, the first electrode 100B may be formed of a transparent electrode material. The second electrode 200A may be formed of a transparent conductive oxide like the second electrode 200A of FIG. 7.

In the current example embodiment, each e first electrode 100B, in the shape of a line, may have an excellent electric conductivity, and each second electrode 200A, having the rhombus shape pattern portions 3, may have an excellent transparency. Accordingly, the touch-fingerprint complex sensor according to the current example embodiment may have both excellent electric conductivity and excellent transparency. However, the configurations of the first and second electrodes 100B and 200A of FIG. 8 are only examples, and may vary.

Figure 9:
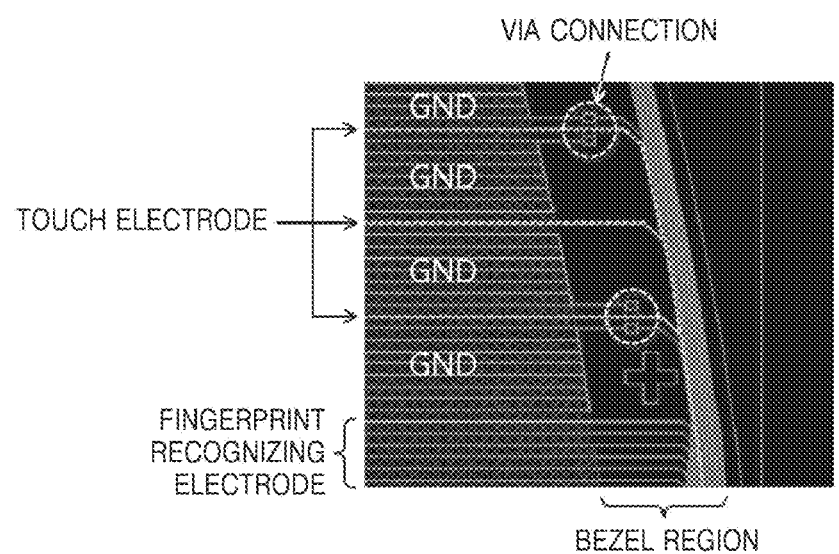
FIG. 9 is a plan view of a configuration of a touch-fingerprint complex sensor according to an example embodiment.

FIG. 9 is a plan view of a configuration of a touch-fingerprint complex sensor exemplarily designed according to an example embodiment.

Referring to FIG. 9, a plurality of touch electrodes (first touch electrodes) may be uniformly distributed, and some of the plurality of touch electrodes may be electrically grouped. A plurality of sub-electrodes (first sub-electrodes) may be disposed between and at two sides of the plurality of touch electrodes. The plurality of sub-electrodes may be electrically connected to each other through a via in a bezel region. During touch detection, a ground voltage GND may be applied to the plurality of sub-electrodes. Meanwhile, the touch electrodes corresponding to a fingerprint recognizing region may be independently provided.

Figure 10:
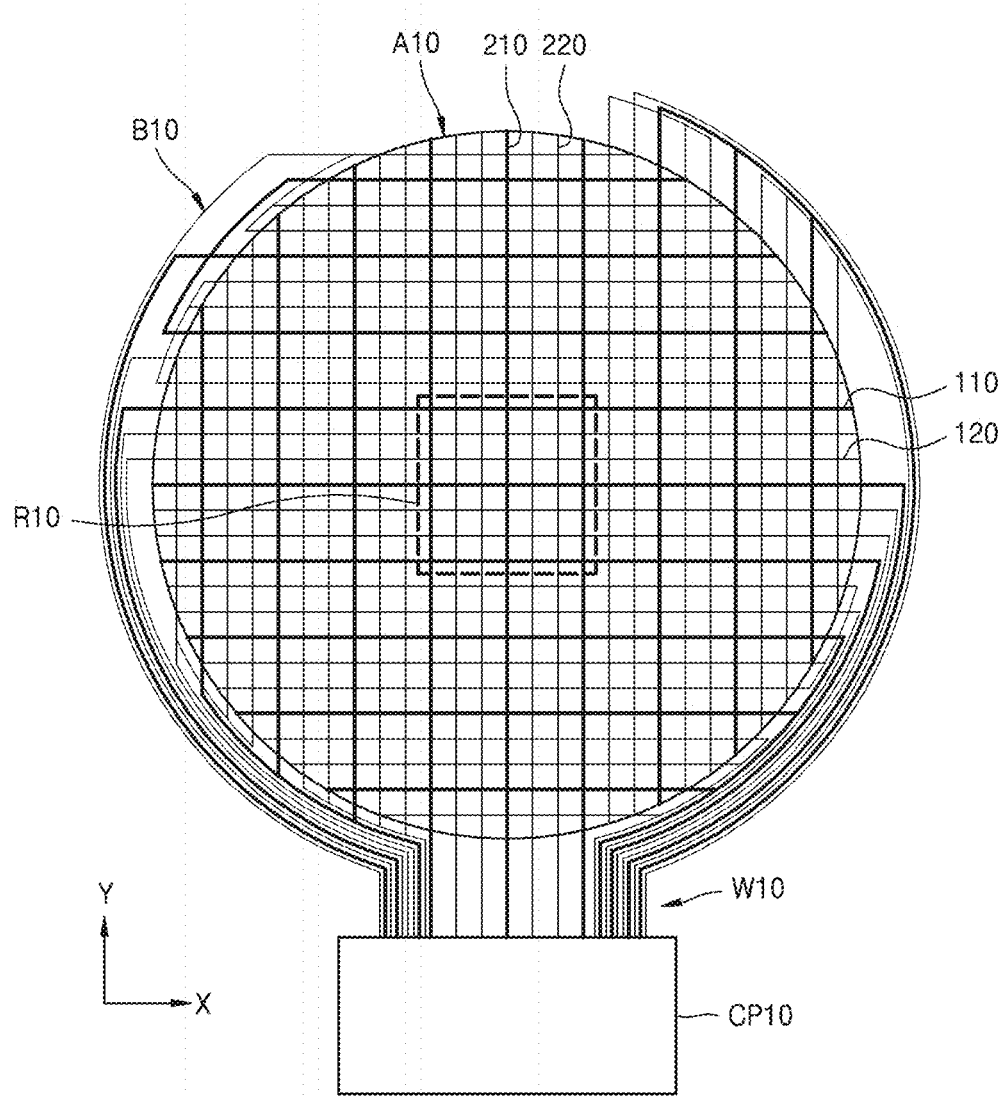
FIG. 10 is a plan view of a touch-fingerprint complex sensor according to another example embodiment.

FIG. 10 is a plan view of a touch-fingerprint complex sensor according to another example embodiment.

The touch-fingerprint complex sensor of FIG. 10 is the same as that of FIG. 1, except that the touch-fingerprint complex sensor of FIG. 10 further includes a circuit portion CP10 connected to the wiring portion W10. The circuit portion CP10 may include a driving IC and a readout IC. The circuit portion CP10 may include an AFE amplifier. When the plurality of first touch electrodes 110 are TX electrodes and the plurality of second touch electrodes 210 are RX electrodes, a ground voltage may be applied to the plurality of first sub-electrodes 120 and a first bias voltage, different from the ground voltage, may be applied to the plurality of second sub-electrodes 220 in a touch detecting mode. Here, the first bias voltage may be the same as or substantially the same as an input bias voltage of the AFE amplifier. As such, when a fixed bias voltage is applied to the pluralities of the first and second sub-electrodes 120 and 220 in the touch detecting mode, noise may be reduced and a touch detecting performance may be increased.

Figure 11:
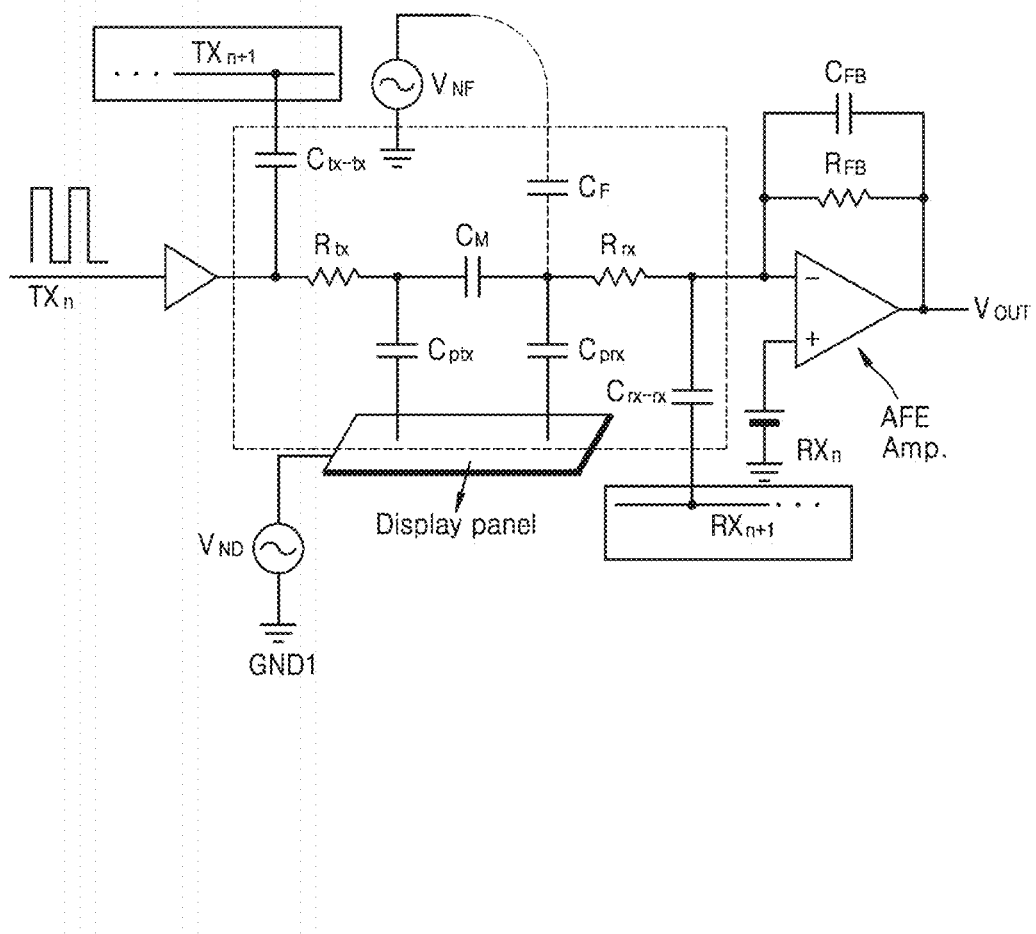
FIG. 11 is a circuit diagram of a circuit configuration used in a touch-fingerprint complex sensor, according to an example embodiment.

FIG. 11 is a circuit diagram of a circuit configuration applicable to a touch-fingerprint complex sensor, according to an example embodiment.

Referring to FIG. 11, TX electrodes include an $n^{th}$ TX electrode $TX_n$ and $n+1^{th}$ TX electrode $TX_{n+1}$, and RX electrodes include an $n^{th}$ RX electrode $RX_n$ and $n+1^{th}$ RX electrode $RX_{n+1}$. Mutual capacitance $C_M$ is formed on a display panel by the TX electrodes and the RX electrodes. Also, parasitic capacitance $C_{ptx}$, capacitance $C_{tx-tx}$ between the TX electrodes, capacitance $C_{rx-rx}$ between RX electrodes, resistance $R_{tx}$ of the TX electrodes, and resistance $R_{rx}$ of the RX electrodes may be formed. A first voltage source $V_{ND}$ may be connected to the display panel, and independently, a second voltage source $V_{NF}$ may be connected to a sensor unit. Feedback capacitance $C_F$ may be generated between the second voltage source $V_{NF}$ and the sensor unit. Also, an AFE amplifier Amp may be connected to the sensor unit. The AFE amplifier Amp may be connected to an output terminal $V_{out}$. Feedback capacitance $C_{FB}$ and feedback resistance $R_{FB}$ may be generated around the AFE amplifier Amp.

A ground terminal GND1 may be connected to the first voltage source $V_{ND}$ and a certain input voltage may be applied to an input terminal of the AFE amplifier Amp. In a touch detecting mode, a ground voltage may be applied to a plurality of first sub-electrodes of a plurality of first electrodes corresponding to TX electrodes, and a first bias voltage may be applied to a plurality of second sub-electrodes of a plurality of second electrodes corresponding to RX electrodes. Here, the ground voltage may correspond to a voltage of the ground terminal GND1, and the first bias voltage may correspond to an input bias voltage of the AFE amplifier Amp. Accordingly, an effect of parasitic capacitance between adjacent channels (electrodes) may be reduced, noise may be reduced, and a sensing performance may be increased.

Figure 12:
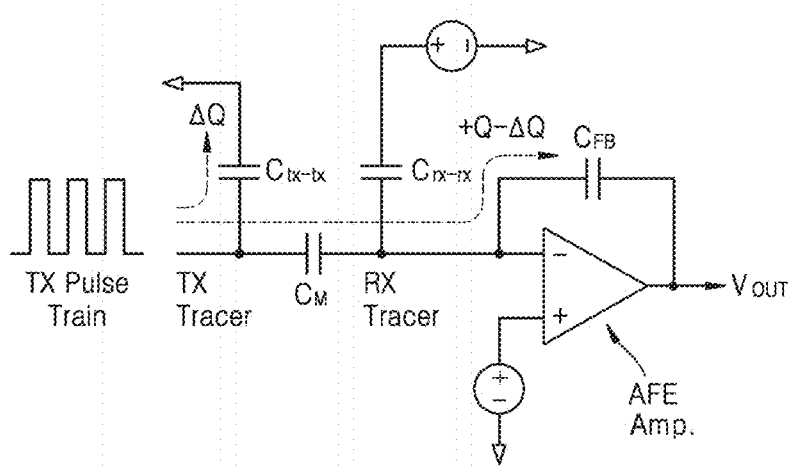
FIG. 12 is a circuit diagram for explaining a charge amount according to a circuit configuration and a path of a partial region of FIG. 11.

FIG. 12 is a circuit diagram for explaining a charge amount according to a circuit configuration and a path of a partial region of FIG. 11.

Referring to FIG. 12, a charge of ΔQ may flow to an adjacent channel before mutual capacitance $C_M$, and accordingly, a charge of Q-ΔQ may flow to an output terminal $V_{OUT}$. When a first bias voltage, different from an input bias voltage of an AFE amplifier Amp, is not applied to a plurality of second sub-electrodes during touch detection, charges of Q-Δ2Q may flow to the output terminal $V_{OUT}$, and as a result, a sensing performance may be decreased. However, in the current example embodiment, since the charges of Q-ΔQ flow to the output terminal $V_{OUT}$, a sensing performance may be increased. The circuit configurations of FIGS. 11 and 12 are only examples, and may vary.

Figure 13:
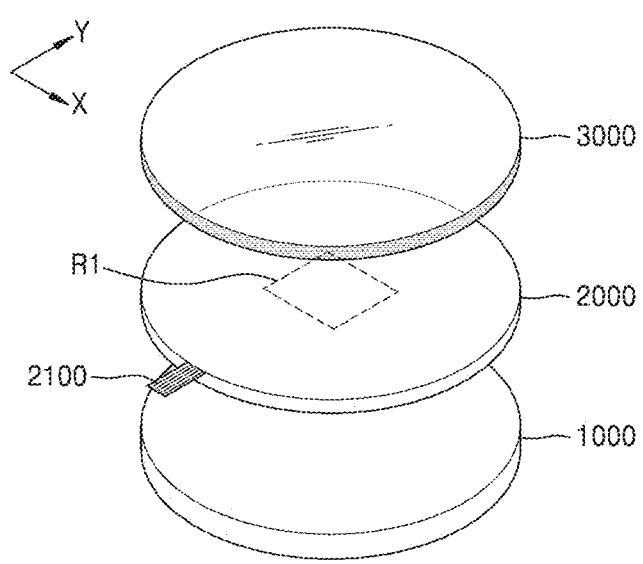
FIG. 13 is an exploded perspective view for describing an electronic apparatus including a touch-fingerprint complex sensor, according to an example embodiment.

FIG. 13 is an exploded perspective view for describing an electronic apparatus to which a touch-fingerprint complex sensor 2000 is applied, according to an example embodiment. In the current example embodiment, the touch-fingerprint complex sensor is circular.

Referring to FIG. 13, a display panel 1000 may be provided, and the touch-fingerprint complex sensor 2000 may be provided on the display panel 1000. The display panel 1000 may be, for example, a liquid crystal display (LCD), but is not limited thereto and may vary. Any one of various display devices, such as an organic light-emitting diode (OLED) panel, may be applied to the display panel 1000.

The touch-fingerprint complex sensor 2000 may include a fingerprint recognizing region R1. A connector 2100 may extend from the touch-fingerprint complex sensor 2000. The connector 2100 may include a plurality of wires. The connector 2100 may be connected to a certain detecting circuit (not shown). The touch-fingerprint complex sensor 2000 may include a plurality of first electrodes and a plurality of second electrodes intersecting the plurality of first electrodes. Mutual capacitance may be formed between the plurality of first electrodes and the plurality of second electrodes. Accordingly, the touch-fingerprint complex sensor 2000 may be a mutual capacitance type sensor. An insulating layer may be provided between the plurality of first electrodes and the plurality of second electrodes. The insulating layer may be transparent. The touch-fingerprint complex sensor 2000 may be formed on a certain sub-substrate.

A transparent film 3000 may be provided to cover the touch-fingerprint complex sensor 2000. The transparent film 3000 may be formed of a transparent insulating material, such as glass.

Figure 14:
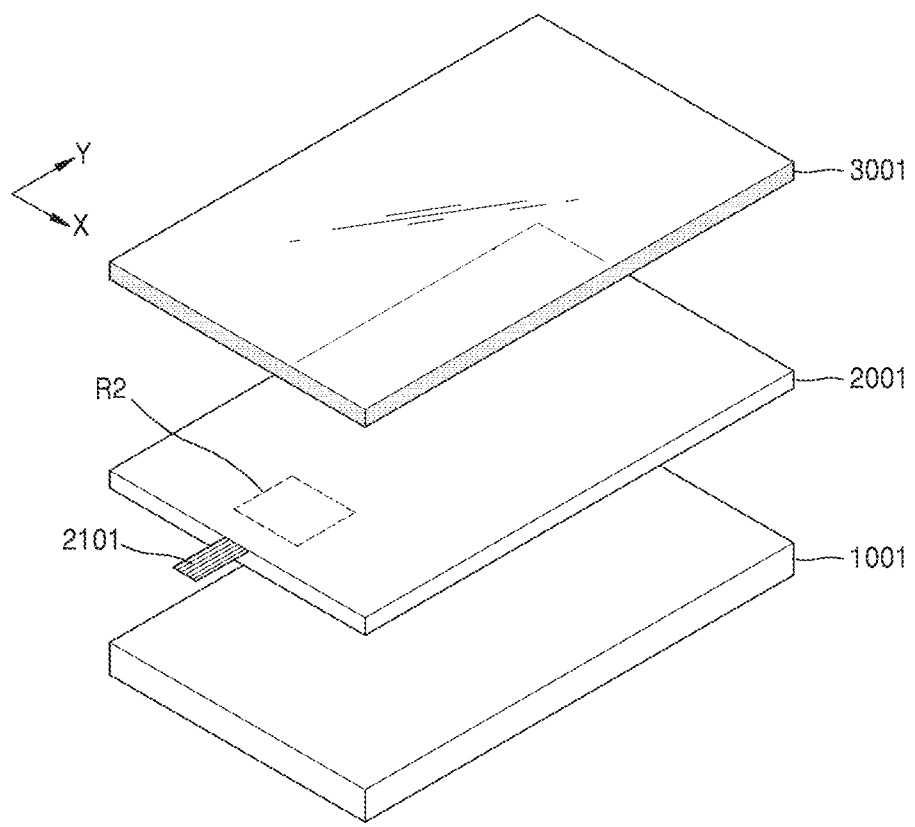
FIG. 14 is an exploded perspective view for describing an electronic apparatus including a touch-fingerprint complex sensor, according to another embodiment.

FIG. 14 is an exploded perspective view for describing an electronic apparatus to which a touch-fingerprint complex sensor 2001 is applied, according to another example embodiment. In the current example embodiment, the touch-fingerprint complex sensor 2001 is rectangular.

Referring to FIG. 14, the touch-fingerprint complex sensor 2001 may be disposed on a display panel 1001, and a transparent film 3001 may be provided on the touch-fingerprint complex sensor 2001. The touch-fingerprint complex sensor 2001 may include a fingerprint recognizing region R2, and a connector 2101 may extend from the touch-fingerprint complex sensor 2001. In the current embodiment, the touch-fingerprint complex sensor 2001 may have a rectangular structure, and the electronic apparatus including the touch-fingerprint complex sensor 2001 may also have a rectangular structure.

A touch-fingerprint complex sensor according to various example embodiments may be applied to any electronic apparatus including an existing touch display. The touch-fingerprint complex sensor is an on-screen capacitance type device, and may be applied to a fingerprint recognizable touch screen apparatus. For example, the touch-fingerprint complex sensor may be applied to a mobile device, such as a smart watch, a smart phone, or a tablet personal computer (PC), or a wearable device. Also, the touch-fingerprint complex sensor may be applied to any one of various electronic devices, such as a home appliance, an automatic teller machine (ATM), an automatic ticketing machine, and a navigation device. The touch-fingerprint complex sensor may be applied to a mobile device, an access control system, or a financial device, which require personal authentication through fingerprint recognition, in various manners.

Figures 15A, 15B, 15C:
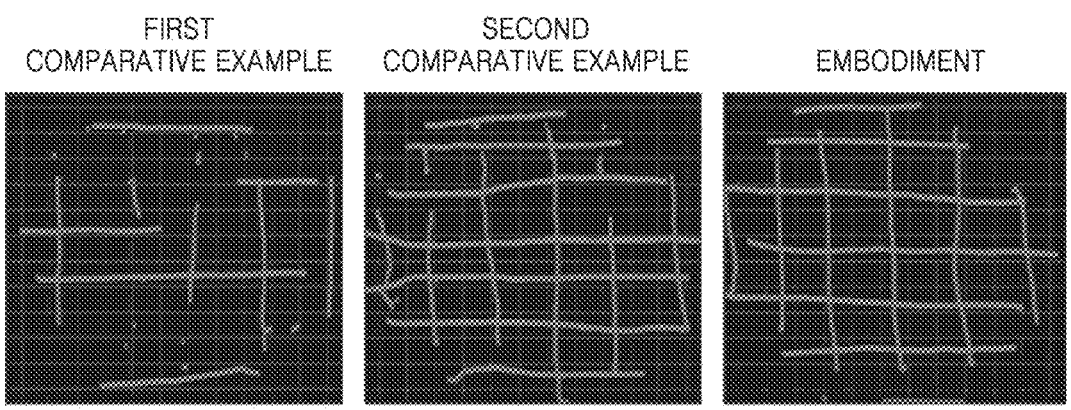
FIGS. 15A, 15B, and 15C are diagrams showing evaluation results of touch sensing performance of touch-fingerprint complex sensors according to an example embodiment and the first and second comparative examples.

FIGS. 15A through 15C are diagrams showing evaluation results regarding touch sensing performance of the touch-fingerprint complex sensors according to an example embodiment and to the first and second comparative examples.

FIG. 15A illustrates a result with respect to the touch-fingerprint complex sensor of the first comparative example of FIG. 5, FIG. 15B illustrates a result with respect to the touch-fingerprint complex sensor of the second comparative example of FIG. 6, and FIG. 15C illustrates a result with respect to the touch-fingerprint complex sensor of the example embodiment of FIG. 1. In FIGS. 15A through 15C, the touch-fingerprint complex sensors each include 32 RX lines and 32 TX lines.

When touch lines are in the "single uniform arrangement" as in the first comparative example of FIG. 15A, sensitivity is low due to the low mutual capacitance Cm and sensing linearity is not satisfactory with respect to a touch input due to wide intervals between the TX lines. When touch lines are in the "bundle non-uniform arrangement" as in the second comparative example of FIG. 15B, linearity is better than in the first comparative example of FIG. 15A, but is still not satisfactory. When touch lines are in "bundle/distributed uniform arrangement" as in the example embodiment of FIG. 15C, excellent linearity is obtained with respect to a touch input signal. Accordingly, by using the touch-fingerprint complex sensor according to the example embodiment, excellent touch linearity may be obtained compared to those of the first and second comparative examples.

FIGS. 16A through 18C are diagrams showing evaluation results regarding touch sensing performance of the touch-fingerprint complex sensors according to an example embodiment and the first and second comparative examples when the evaluation is conducted in a different manner from that shown in FIGS. 15A through 15C.

Figure 16A:
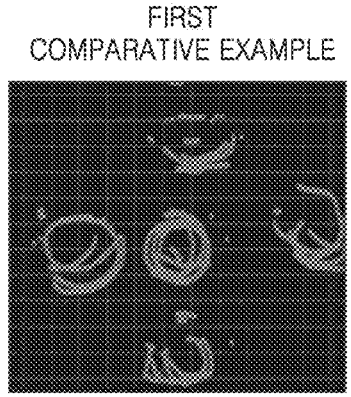
FIGS. 16A, 16B, 16C, 17A, 17B, 17C, 18A, 18B, and 18C are diagrams showing evaluation results of touch sensing performance of the touch-fingerprint complex sensors according to an example embodiment and the first and second comparative examples.
Figure 16B:
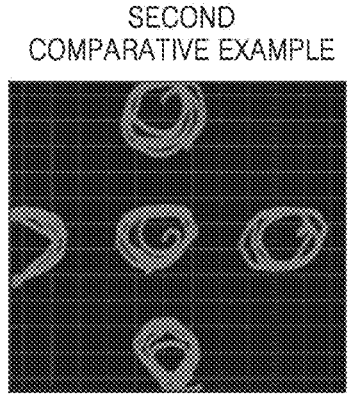
Figure 16C:
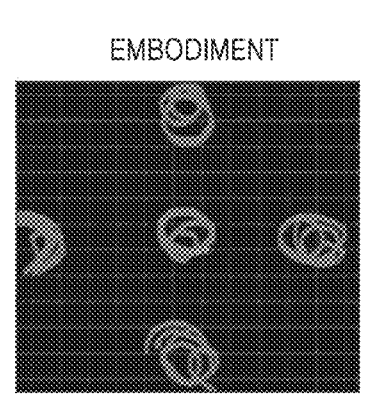
Figure 17A:
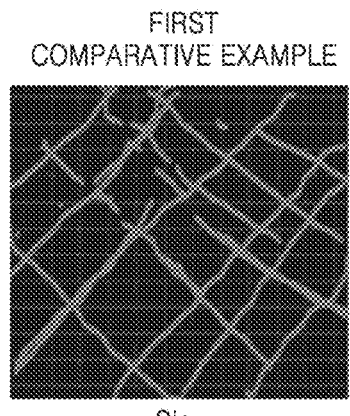
Figure 17B:
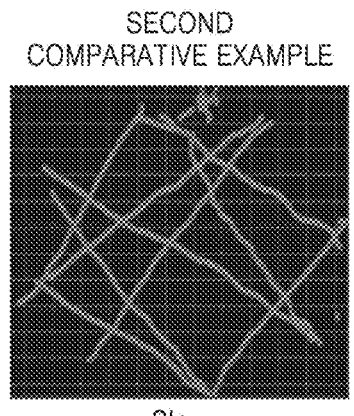
Figure 17C:
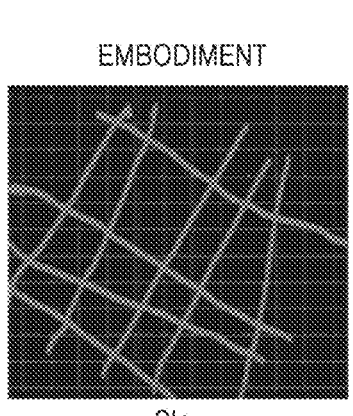
Figure 18A:
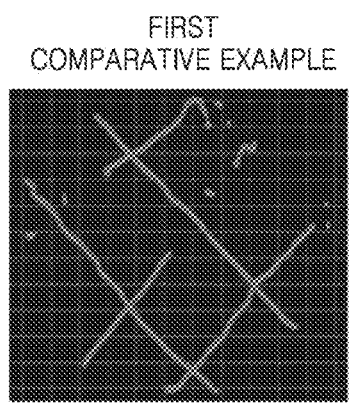
Figure 18B:
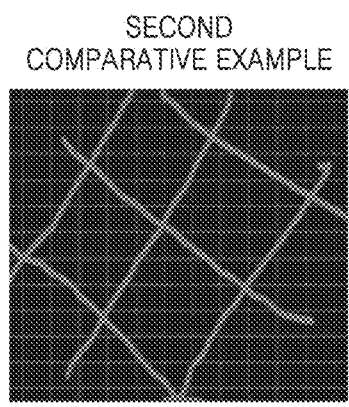
Figure 18C:
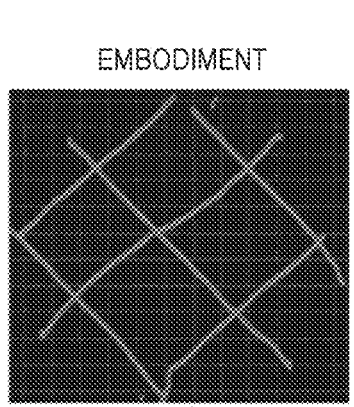

FIGS. 16A through 16C illustrate evaluation results when the touch-fingerprint complex sensors are touched in a circular motion, and FIGS. 17A through 18C illustrate evaluation results when the touch-fingerprint complex sensors are touched linearly in a diagonal direction. The touch-fingerprint complex sensors are touched at a relatively slow speed in FIGS. 17A through 17C, and the touch-fingerprint complex sensors are touched at a relatively fast speed in FIGS. 18A through 18C. FIGS. 16A, 17A, and 18A correspond the first comparative example of FIG. 15A, FIGS. 16B, 17B, and 18B correspond to the second comparative example of FIG. 15B, and FIGS. 16C, 17C, and 18C correspond to the example embodiment of FIG. 15C.

Referring to FIGS. 16A through 18C, the touch-fingerprint complex sensors according to the example embodiment show excellent touch sensing performance. On the other hand, the touch-fingerprint complex sensors according to the first and second comparative example show low linearity and low detecting performance.

Figure 19:
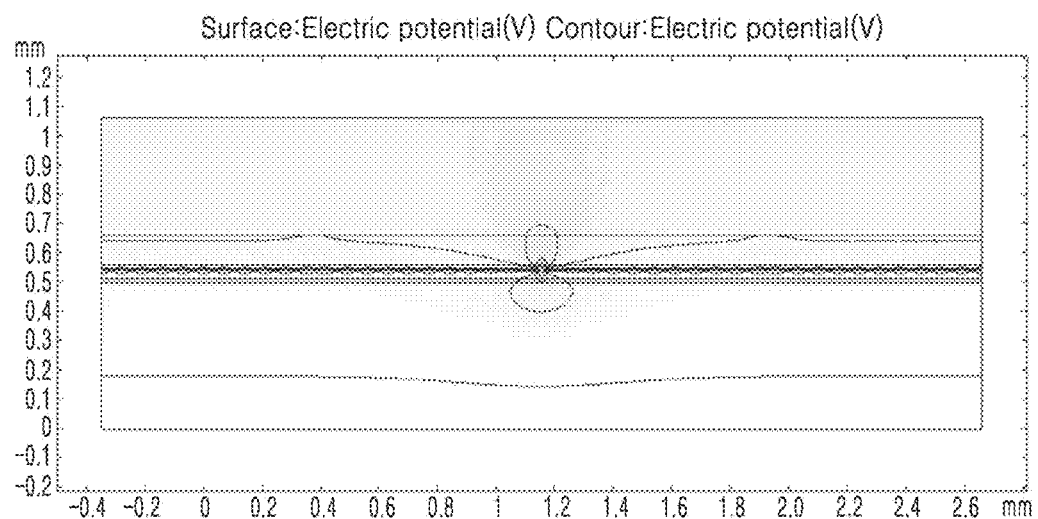
FIG. 19 is a graph showing simulation results regarding an electric potential of a transmit (TX) electrode line and dummy lines at a cutting plane according to a receive (RX) electrode line with respect to a sensor according to a comparative example.

FIG. 19 is a graph showing simulation results regarding an electric potential of a TX electrode line and dummy lines at a cutting plane according to a RX electrode line, with respect to a sensor according to a comparative example. One TX electrode line is located at the center and a plurality of dummy lines (sub-lines) are arranged at two sides of the TX electrode line. Here, the plurality of dummy lines electrically float.

Figure 20:
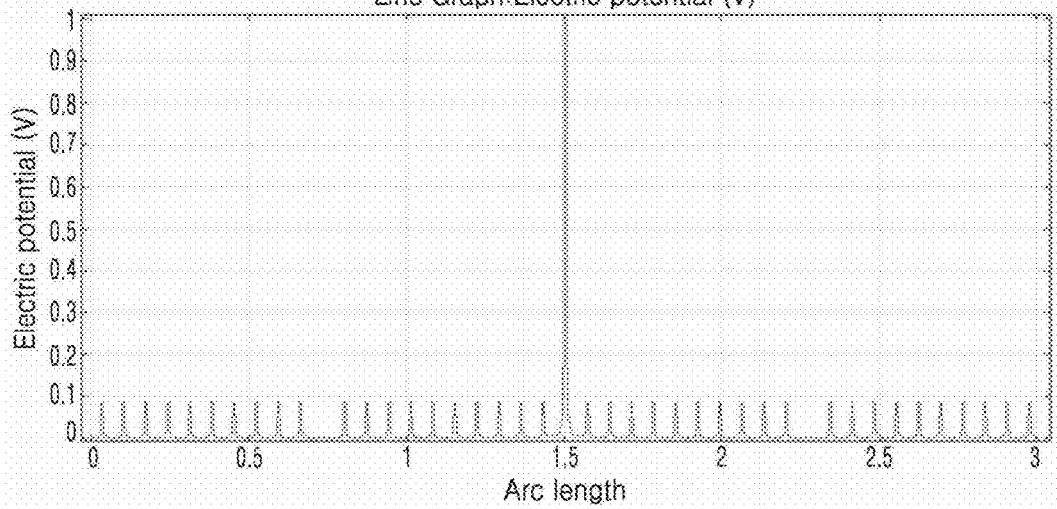
FIG. 20 is a graph corresponding to the simulation results of FIG. 19 and showing a change of an electric potential according to the RX electrode line on a TX electrode surface.

FIG. 20 is a graph corresponding to the simulation results of FIG. 19 and showing a change of electric potential according to the RX electrode line on a TX electrode surface. Referring to FIG. 20, a spike peak is generated at the center corresponding to the one TX electrode line and small peaks are generated by the plurality of dummy lines at the sides of the TX electrode line. The peaks of the dummy lines correspond to noise.

Figure 21:
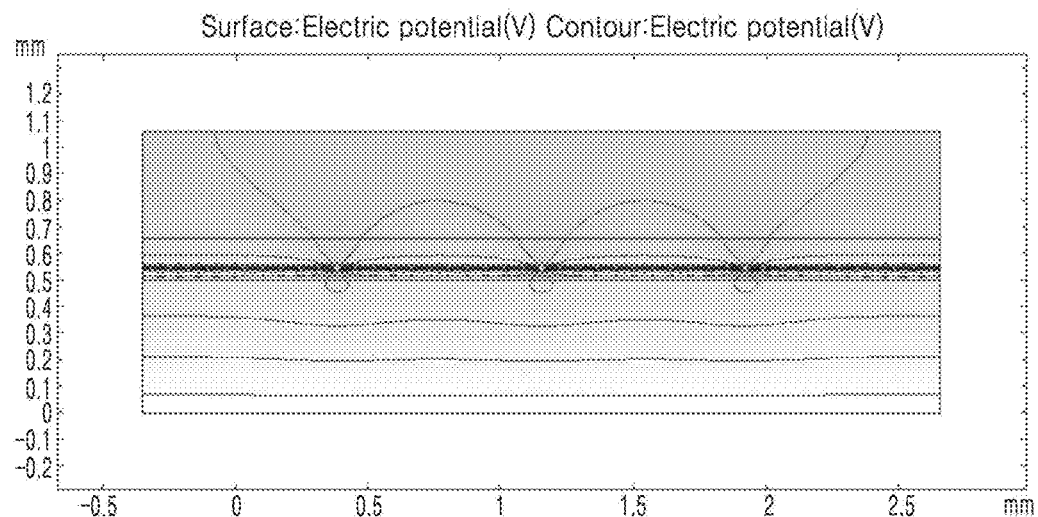
FIG. 21 is a graph showing simulation results regarding an electric potential of a TX electrode line and dummy lines at a cutting plane according to a RX electrode line with respect to a sensor according to another comparative example.

FIG. 21 is a graph showing simulation results regarding electric potential of a TX electrode line and dummy lines at a cutting plane according to a RX electrode line, with respect to a sensor according to another comparative example. In FIG. 21, three TX electrode lines are arranged and a plurality of dummy lines (sub-lines) are arranged between and two sides of the three TX electrode lines. Here, the plurality of dummy lines electrically float.

Figure 22:
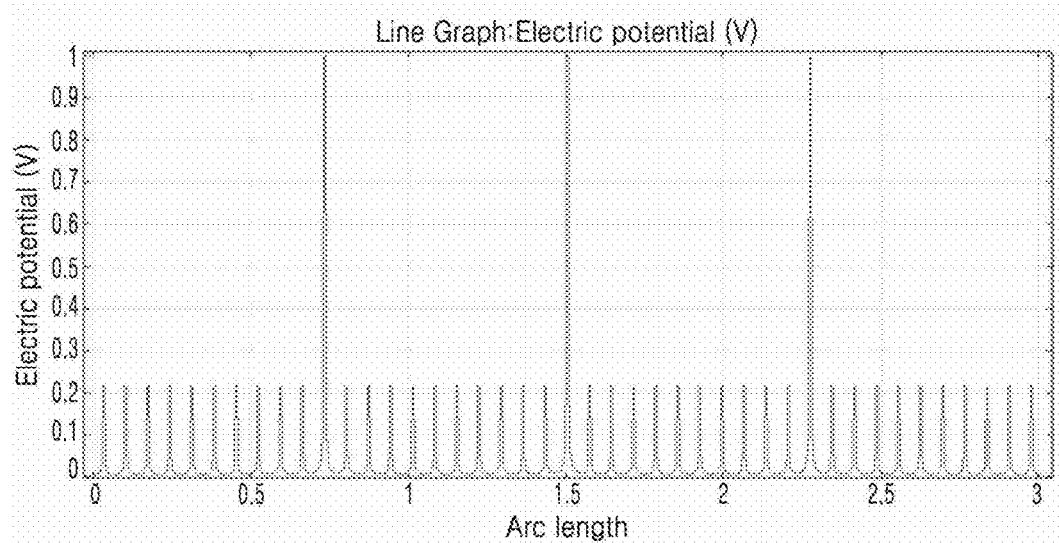
FIG. 22 is a graph corresponding to the simulation results of FIG. 21 and showing a change of an electric potential according to the RX electrode line on a TX electrode surface.

FIG. 22 is a graph corresponding to the simulation results of FIG. 21 and showing a change of electric potential according to the RX electrode line on a TX electrode surface. Referring to FIG. 22, a spike peak is generated at regions corresponding to the three TX electrode lines and small peaks are generated by the plurality of dummy lines between and sides of the TX electrode lines. The peaks of the dummy lines correspond to noise.

Figure 23:
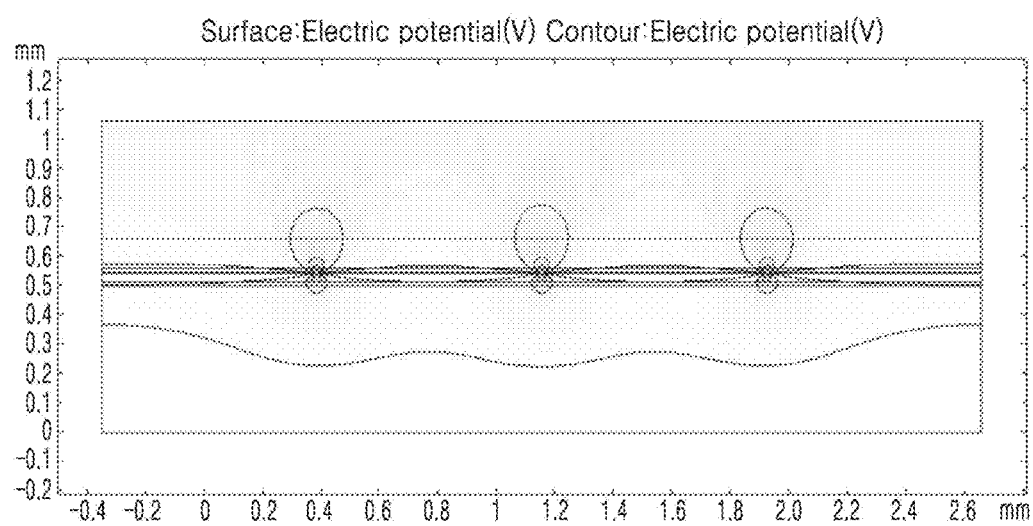
FIG. 23 is a graph showing simulation results regarding an electric potential of TX electrode lines and dummy lines at a cutting plane according to a RX electrode line with respect to a sensor according to an example embodiment.

FIG. 23 is a graph showing simulation results regarding electric potential of TX electrode lines and dummy lines at a cutting plane according to a RX electrode line, with respect to a sensor according to an example embodiment. In FIG. 23, three TX electrode lines are arranged and a plurality of dummy lines (sub-lines) are arranged between and two sides of the three TX electrode lines. Here, the plurality of dummy lines are grounded.

Figure 24:
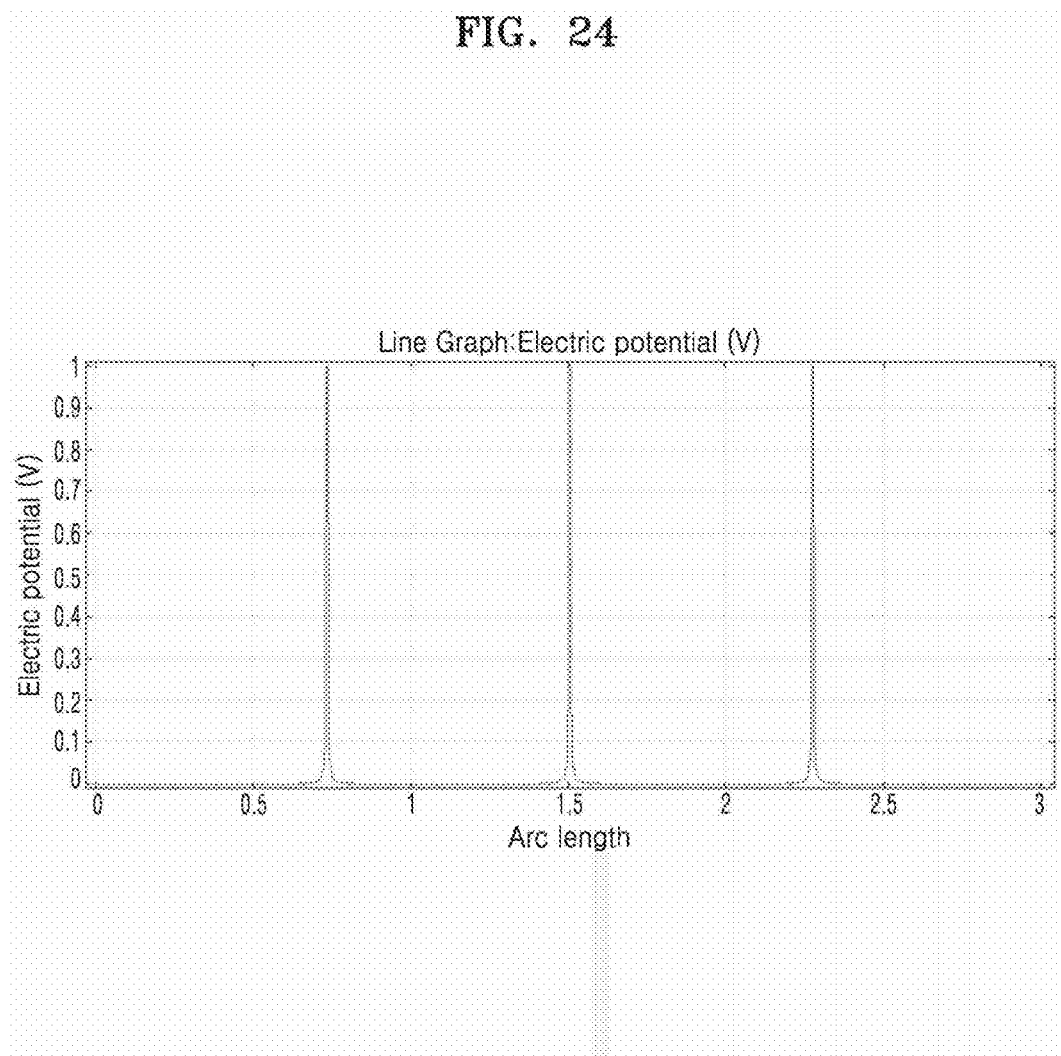
FIG. 24 is a graph corresponding to the simulation results of FIG. 23 and showing a change of an electric potential according to the RX electrode line on a TX electrode surface.

FIG. 24 is a graph corresponding to the simulation results of FIG. 23 and showing a change of electric potential according to the RX electrode line on a TX electrode surface. Referring to FIG. 24, a spike peak is generated at regions corresponding to the three TX electrode lines and peaks are not generated by the plurality of dummy lines between and sides of the TX electrode lines. Accordingly, sensing may be performed with excellent sensitivity, without noise generated by the dummy lines.

Figure 25:
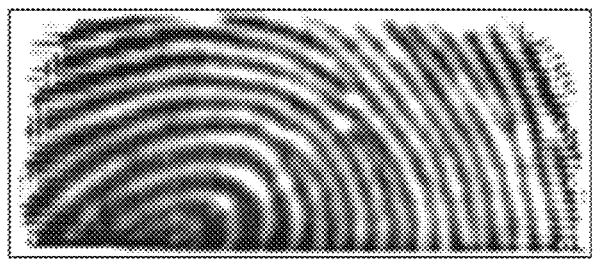
FIG. 25 illustrates a sensing image in a fingering recognizing region in which a fingerprint is detected by using a touch-fingerprint complex sensor according to a comparative example.

FIG. 25 illustrates a sensing image in a fingering recognizing region when a fingerprint is detected by using a touch-fingerprint complex sensor according to a comparative example. In FIG. 25, a fixed bias voltage is not applied to dummy lines (sub-lines) outside the fingerprint recognizing region when a fingerprint is detected.

Figure 26:
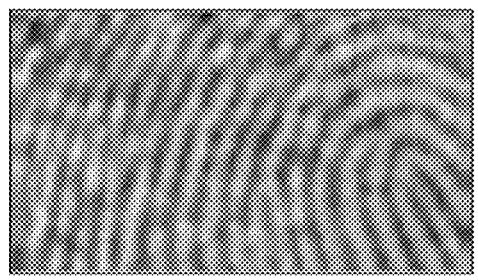
FIG. 26 illustrates a sensing image in a fingering recognizing region in which a fingerprint is detected by using a touch-fingerprint complex sensor according to an example embodiment.

FIG. 26 illustrates a sensing image in a fingering recognizing region when a fingerprint is detected by using a touch-fingerprint complex sensor according to an example embodiment. In FIG. 26, a fixed bias voltage is applied to dummy lines (sub-lines) outside the fingerprint recognizing region when a fingerprint is detected, as in the manner described above.

Comparing FIGS. 25 and 26, in the comparative example of FIG. 25, the image quality is low in an edge portion, but in the example embodiment of FIG. 26, the image quality is uniform throughout regions including an edge portion and measuring performance is high.

It should be understood that the example embodiments described herein should be considered in a descriptive sense only and not for purposes of limitation. For example, it would be obvious to one of ordinary skill in the art that a touch-fingerprint complex sensor, an electronic apparatus including the touch-fingerprint complex sensor, and a n operating method of the touch-fingerprint complex sensor described above with reference to FIGS. 1 through 4 and 7 through 14 may be variously modified. For example, in the above embodiments, a plurality of touch detecting electrodes and a plurality of fingerprint detecting electrodes are mounted together in one layer structure, but alternatively, a plurality of touch detecting electrodes may be formed in a first layer structure (substrate structure) and a plurality of fingerprint detecting electrodes may be formed in a second layer structure (substrate structure), and the first and second layer structures may be combined. While one or more embodiments have been described with reference to the figures, it will be understood by those of ordinary skill in the art that various changes in form and details may be made therein without departing from the spirit and scope as defined by the following claims.

What is claimed is:

1. A touch-fingerprint complex sensor comprising:
a touch pad comprising a fingerprint recognizing region;
a plurality of first electrodes extending in a first direction in the touch pad; and
a plurality of second electrodes extending in a second direction in the touch pad, wherein the second direction intersects the first direction,
wherein the plurality of first electrodes comprises:
a first unit group comprising a plurality of first touch electrodes electrically connected to each other, and
a plurality of first sub-electrodes, wherein at least two of the plurality of first sub-electrodes are disposed between adjacent touch electrodes of the plurality of first touch electrodes, and
wherein the plurality of second electrodes comprises:
a second unit group comprising a plurality of second touch electrodes electrically connected to each other and disposed at substantially regular intervals, and
a plurality of second sub-electrodes disposed between the plurality of second touch electrodes,
wherein end portions of each of first electrodes corresponding to the fingerprint recognizing region, from among the plurality of first electrodes, are independently provided without being electrically connected to each other, and
end portions of each of second electrodes corresponding to the fingerprint recognizing region, from among the plurality of second electrodes, are independently provided without being electrically connected to each other.

2. A touch-fingerprint complex sensor comprising:
a touch pad comprising a fingerprint recognizing region,
a plurality of first electrodes extending in a first direction in the touch pad; and
a plurality of second electrodes extending in a second direction in the touch pad, wherein the second direction intersects the first direction,
wherein the plurality of first electrodes comprises:
a first unit group comprising a plurality of first touch electrodes electrically connected to each other, and
a plurality of first sub-electrodes, wherein at least two of the plurality of first sub-electrodes are disposed between adjacent touch electrodes of the plurality of first touch electrodes, and
wherein the plurality of second electrodes comprises:
a second unit group comprising a plurality of second touch electrodes electrically connected to each other and disposed at substantially regular intervals, and
a plurality of second sub-electrodes disposed between the plurality of second touch electrodes,
wherein the plurality of first sub-electrodes comprises a first group of first sub-electrodes disposed at one side of a first one of the plurality of first touch electrodes, and a second group of first sub-electrodes disposed at another side of the first one of the plurality of first touch electrodes, and
wherein the first group of first sub-electrodes is electrically connected to the second group of first sub-electrodes.

3. The touch-fingerprint complex sensor of claim 2, wherein the plurality of first sub-electrodes further comprises a third group of first sub-electrodes disposed at one side of a second one of the plurality of first touch electrodes, and a fourth group of first sub-electrodes disposed at another side of the second one of the plurality of first touch electrodes, and
wherein the third group of first sub-electrodes is electrically connected to the fourth group of first sub-electrodes.

4. The touch-fingerprint complex sensor of claim 2, further comprising:
a first connecting wire connecting end portions of each of the plurality of first touch electrodes of the first unit group; and
a second connecting wire connecting an end portion of each of the plurality of first sub-electrodes of the first group of first sub-electrodes to an end portion of each of the plurality of first sub-electrodes of the second group of first sub-electrodes,
wherein the first connecting wire and the second connecting wire intersect each other as viewed from above.

5. The touch-fingerprint complex sensor of claim 4, wherein one of the first connecting wire or the second connecting wire comprises a via structure and a conductive plug disposed in the via structure.

6. The touch-fingerprint complex sensor of claim 2, wherein the plurality of second sub-electrodes comprise a first group of second sub-electrodes disposed at one side of a first one of the plurality of second touch electrodes, and a second group of second sub-electrodes disposed at another side of the first one of the plurality of second touch electrodes, and
wherein the first group of second sub-electrodes is electrically connected to the second group of second sub-electrodes.

7. The touch-fingerprint complex sensor of claim 6, wherein the plurality of second sub-electrodes further comprises a third group of second sub-electrodes disposed at one side of a second one of the plurality of second touch electrodes, and a fourth group of second sub-electrodes disposed at another side of the second one of the plurality of second touch electrodes, and
wherein the third group of second sub-electrodes is electrically connected to the fourth group of second sub-electrodes.

8. The touch-fingerprint complex sensor of claim 6, further comprising:
a first connecting wire connecting end portions of each of the plurality of second touch electrodes of the second unit group; and
a second connecting wire connecting an end portion of each of the plurality of second sub-electrodes of the first group of second sub-electrodes and to an end portion of each of the plurality of second sub-electrodes of the second group of second sub-electrodes,
wherein the first connecting wire and the second connecting wire intersect each other as viewed from above.

9. The touch-fingerprint complex sensor of claim 8, wherein one of the first connecting wire or the second connecting wire comprises a via structure and a conductive plug disposed in the via structure.

10. A touch-fingerprint complex sensor comprising:
a touch pad comprising a fingerprint recognizing region;
a plurality of first electrodes extending in a first direction in the touch pad; and
a plurality of second electrodes extending in a second direction in the touch pad, wherein the second direction intersects the first direction,
wherein the plurality of first electrodes comprises:
a first unit group comprising a plurality of first touch electrodes electrically connected to each other, and
a plurality of first sub-electrodes, wherein at least two of the plurality of first sub-electrodes are disposed between adjacent touch electrodes of the plurality of first touch electrodes, and wherein the plurality of second electrodes comprises:
a second unit group comprising a plurality of second touch electrodes electrically connected to each other and disposed at substantially regular intervals, and
a plurality of second sub-electrodes disposed between the plurality of second touch electrodes,
wherein a plurality of first unit groups is provided on at least one side of two sides of the fingerprint recognizing region with respect to the second direction,
wherein a plurality of second unit groups is provided on at least one side of other two sides of the fingerprint recognizing region with respect to the first direction,
wherein the first unit group is included in the plurality of first unit groups, and
wherein the second unit group is included in the plurality of second unit groups.

11. The touch-fingerprint complex sensor of claim 1, wherein the first unit group comprises at least three first touch electrodes, and
the second unit group comprises at least three second touch electrodes.

12. The touch-fingerprint complex sensor of claim 1, wherein the touch pad comprises an active region comprising the fingerprint recognizing region, and a peripheral region around the active region,
wherein the peripheral region comprises a plurality of wires connecting the plurality of first electrodes and the plurality of second electrodes to a circuit unit, and
wherein at least two of the plurality of first electrodes and at least two of the plurality of second electrodes are electrically connected in the peripheral region.

13. The touch-fingerprint complex sensor of claim 1, wherein a shape of the touch pad is one of a circular shape or an oval shape.

14. The touch-fingerprint complex sensor of claim 13, wherein the touch pad comprises an active region and a bezel region around the active region, and
wherein at least two of the plurality of first electrodes and at least two of the plurality of second electrodes are electrically connected in the bezel region.

15. The touch-fingerprint complex sensor of claim 1, wherein a shape of the touch pad is rectangular.

16. The touch-fingerprint complex sensor of claim 1, wherein the touch-fingerprint complex sensor is configured to, in a touch detecting mode, selectively activate the plurality of first touch electrodes and the plurality of second touch electrodes, and apply a fixed bias voltage to the plurality of first sub-electrodes and the plurality of second sub-electrodes.

17. The touch-fingerprint complex sensor of claim 16, wherein the plurality of first touch electrodes are transmit electrodes,
the plurality of second touch electrodes are receive electrodes, and
the touch-fingerprint complex sensor is further configured to, in the touch detecting mode, apply a ground voltage to the plurality of first sub-electrodes and apply a first bias voltage that is different from the ground voltage to the plurality of second sub-electrodes.

18. The touch-fingerprint complex sensor of claim 17, further comprising:
a circuit unit connected to the plurality of first electrodes and the plurality of second electrodes,
wherein the circuit unit comprises an analog front-end (AFE) amplifier, and wherein the first bias voltage is a same voltage as an input bias voltage of the AFE amplifier.

19. The touch-fingerprint complex sensor of claim 1, wherein the touch-fingerprint complex sensor is configured to, in a fingerprint recognizing mode, selectively activate first electrodes corresponding to the fingerprint recognizing region, from among the plurality of first electrodes, and second electrodes corresponding to the fingerprint recognizing region, from among the plurality of second electrodes, and apply a fixed bias voltage to remaining ones of the plurality of first electrodes and the plurality of second electrodes.

20. An electronic apparatus comprising the touch-fingerprint complex sensor of claim 1.

21. A touch-fingerprint complex sensor configured to detect a touch and a fingerprint of a user, the touch-fingerprint complex sensor comprising:
a first unit group comprising a plurality of first touch electrodes electrically connected to each other;
a plurality of first sub-electrodes, wherein at least one of the plurality of first sub-electrodes is disposed between adjacent first touch electrodes of the plurality of first touch electrodes;
a second unit group comprising a plurality of second touch electrodes electrically connected to each other and intersecting the plurality of first touch electrodes; and
a plurality of second sub-electrodes,
wherein at least one of the plurality of second sub-electrodes is disposed between adjacent second touch electrodes of the plurality of second touch electrodes, and
wherein the touch-fingerprint complex sensor is configured to, in a touch detecting mode, selectively drive the plurality of first touch electrodes and the plurality of second touch electrodes and apply a fixed bias voltage to the plurality of first sub-electrodes and the plurality of second sub-electrodes.

22. The touch-fingerprint complex sensor of claim 21, wherein the plurality of first touch electrodes are transmit electrodes,
wherein the plurality of second touch electrodes are receive electrodes, and
wherein the touch-fingerprint complex sensor is further configured to, in the touch detecting mode, apply a ground voltage to the plurality of first sub-electrodes and apply a first bias voltage that is different from the ground voltage to the plurality of second sub-electrodes.

23. The touch-fingerprint complex sensor of claim 22, further comprising a circuit unit,
wherein the circuit unit comprises an analog front-end (AFE) amplifier, and
wherein the first bias voltage is a same voltage as an input bias of the AFE amplifier.

24. The touch-fingerprint complex sensor of claim 21, further comprising:
an active region comprising a fingerprint recognizing region; and
a peripheral region provided around the active region,
wherein the peripheral region comprises at least one of:
a first connection structure in which at least two of the plurality of first touch electrodes are electrically connected;
a second connection structure in which at least two of the plurality of first sub-electrodes are electrically connected;

a third connection structure in which at least two of the plurality of second touch electrodes are electrically connected, or a fourth connection structure in which at least two of the plurality of second sub-electrodes are electrically connected.

25. The touch-fingerprint complex sensor of claim 24, wherein the peripheral region further comprises a via structure and a conductive plug disposed in the via structure.

26. The touch-fingerprint complex sensor of claim 21, wherein a fingerprint recognizing region is defined in the touch-fingerprint complex sensor, wherein end portions of each of first touch electrodes corresponding to the fingerprint recognizing region, from among the plurality of first touch electrodes, and each of first sub-electrodes corresponding to the fingerprint recognizing region, from among the plurality of first sub-electrodes, are independently provided without being electrically connected to each other, and wherein end portions of each of second touch electrodes corresponding to the fingerprint recognizing region, from among the plurality of second touch electrodes, and each of second sub-electrodes corresponding to the fingerprint recognizing region, from among the plurality of second sub-electrodes, are independently provided without being electrically connected to each other.

27. The touch-fingerprint complex sensor of claim 21, wherein a fingerprint recognizing region is defined in the touch-fingerprint complex sensor, and wherein the touch-fingerprint complex sensor is configured to, in a fingerprint recognizing mode, selectively activate electrodes corresponding to the fingerprint recognizing region, from among the plurality of first touch electrodes and the plurality of first sub-electrodes, and electrodes corresponding to the fingerprint recognizing region, from among the plurality of second touch electrodes and the plurality of second sub-electrodes, and apply a fixed bias voltage to remaining electrodes of the plurality of first touch electrodes, the plurality of first sub-electrodes, the plurality of second touch electrodes, and the plurality of second sub-electrodes.

28. The touch-fingerprint complex sensor of claim 21, wherein a shape of the touch-fingerprint complex sensor is one of a circular shape, an oval shape, or a rectangular shape.

29. An electronic apparatus comprising the touch-fingerprint complex sensor of claim 21.

* * * * *